(12) United States Patent
Bartenbach et al.

(10) Patent No.: US 10,012,965 B2
(45) Date of Patent: Jul. 3, 2018

(54) WINDOW AIR CONDITIONING APPARATUS AND CONTROLLER

(71) Applicant: Q Holdings LLC, New York, NY (US)

(72) Inventors: Jeff Bartenbach, Brooklyn, NY (US); Matt Bornski, San Jose, CA (US); Benjamin Kaufman, Fairport, NY (US); Alex Limpaecher, New York, NY (US); Chris Meisner, New York, NY (US); Adam Paskow, New York, NY (US); Nathan Smith, Schenectady, NY (US); Joshua Wright, Boynton Beach, FL (US)

(73) Assignee: QUIRKY IP LICENSING LLC, New York, NY (US)

( * ) Notice: Subject to any disclaimer, the term of this patent is extended or adjusted under 35 U.S.C. 154(b) by 589 days.

(21) Appl. No.: 14/585,019

(22) Filed: Dec. 29, 2014

(65) Prior Publication Data
US 2015/0184881 A1    Jul. 2, 2015

Related U.S. Application Data

(60) Provisional application No. 61/921,343, filed on Dec. 27, 2013.

(51) Int. Cl.
*F24F 11/00*    (2018.01)
*G05B 15/02*    (2006.01)
(Continued)

(52) U.S. Cl.
CPC ............. *G05B 15/02* (2013.01); *F24F 11/30* (2018.01); *F24F 11/62* (2018.01); *F24F 11/77* (2018.01);
(Continued)

(58) Field of Classification Search
None
See application file for complete search history.

(56) References Cited

U.S. PATENT DOCUMENTS

| | | | |
|---|---|---|---|
| 5,979,533 A | 11/1999 | Dupuie | |
| 2002/0032985 A1* | 3/2002 | Kim | F24F 1/0011 49/74.1 |

(Continued)

FOREIGN PATENT DOCUMENTS

| | | |
|---|---|---|
| WO | 2011149600 A2 | 12/2011 |
| WO | 2013155467 A1 | 10/2013 |
| WO | 2013187996 A1 | 12/2013 |

OTHER PUBLICATIONS

International Search Report dated Jun. 25, 2015, that issued in the corresponding International Application No. PCT/US2014/072598.

(Continued)

*Primary Examiner* — Mohammad Ali
*Assistant Examiner* — Bernard G Lindsay
(74) *Attorney, Agent, or Firm* — Hard IP LLC

(57) ABSTRACT

An exemplary aspect comprises an air conditioning apparatus comprising: (a) a controller comprising a microprocessor; (b) a wireless transceiver in communication with the microprocessor and operable to communicate over a wireless network with an application on a mobile device; (c) a compressor controlled by the controller; (d) a fan controlled by the controller; and (e) a front panel that allows a user to interface with the controller. Another exemplary aspect comprises a mobile device comprising a processor and a memory, the memory storing an application that enables a user of the mobile device to adjust settings for an air conditioning apparatus operable to communicate via a wireless network with the mobile device.

20 Claims, 39 Drawing Sheets

(51) Int. Cl.
*F24F 11/30* (2018.01)
*F24F 11/62* (2018.01)
*F24F 11/77* (2018.01)
*F24F 11/56* (2018.01)
*F24F 11/52* (2018.01)

(52) U.S. Cl.
CPC ............... *F24F 11/52* (2018.01); *F24F 11/56* (2018.01); *Y02B 30/746* (2013.01)

(56) References Cited

U.S. PATENT DOCUMENTS

| | | | |
|---|---|---|---|
| 2006/0021370 A1* | 2/2006 | Cho | F24F 1/027 62/262 |
| 2010/0139306 A1* | 6/2010 | Krenik | F25B 9/004 62/402 |
| 2010/0289643 A1* | 11/2010 | Trundle | F24F 11/0086 340/545.1 |
| 2011/0173542 A1* | 7/2011 | Imes | F24F 11/006 715/735 |
| 2012/0064923 A1 | 3/2012 | Imes et al. | |
| 2012/0217315 A1 | 8/2012 | Witbeck et al. | |
| 2013/0144445 A1 | 6/2013 | Steinberg | |
| 2013/0173064 A1 | 7/2013 | Fadell et al. | |
| 2013/0211783 A1 | 8/2013 | Fisher et al. | |
| 2013/0338837 A1* | 12/2013 | Hublou | G05D 23/1923 700/278 |

OTHER PUBLICATIONS

The Electric Imp Platform, captured via Wayback Machine, URL: https://web.archive.org/web/20141216000241/, original URL: http://electricimp.com/product/, archive webpage dated Dec. 16, 2014, 3 pages.

European Extended Search Report dated Nov. 29, 2017 for Application No. 14873177.1, 8 pages.

* cited by examiner

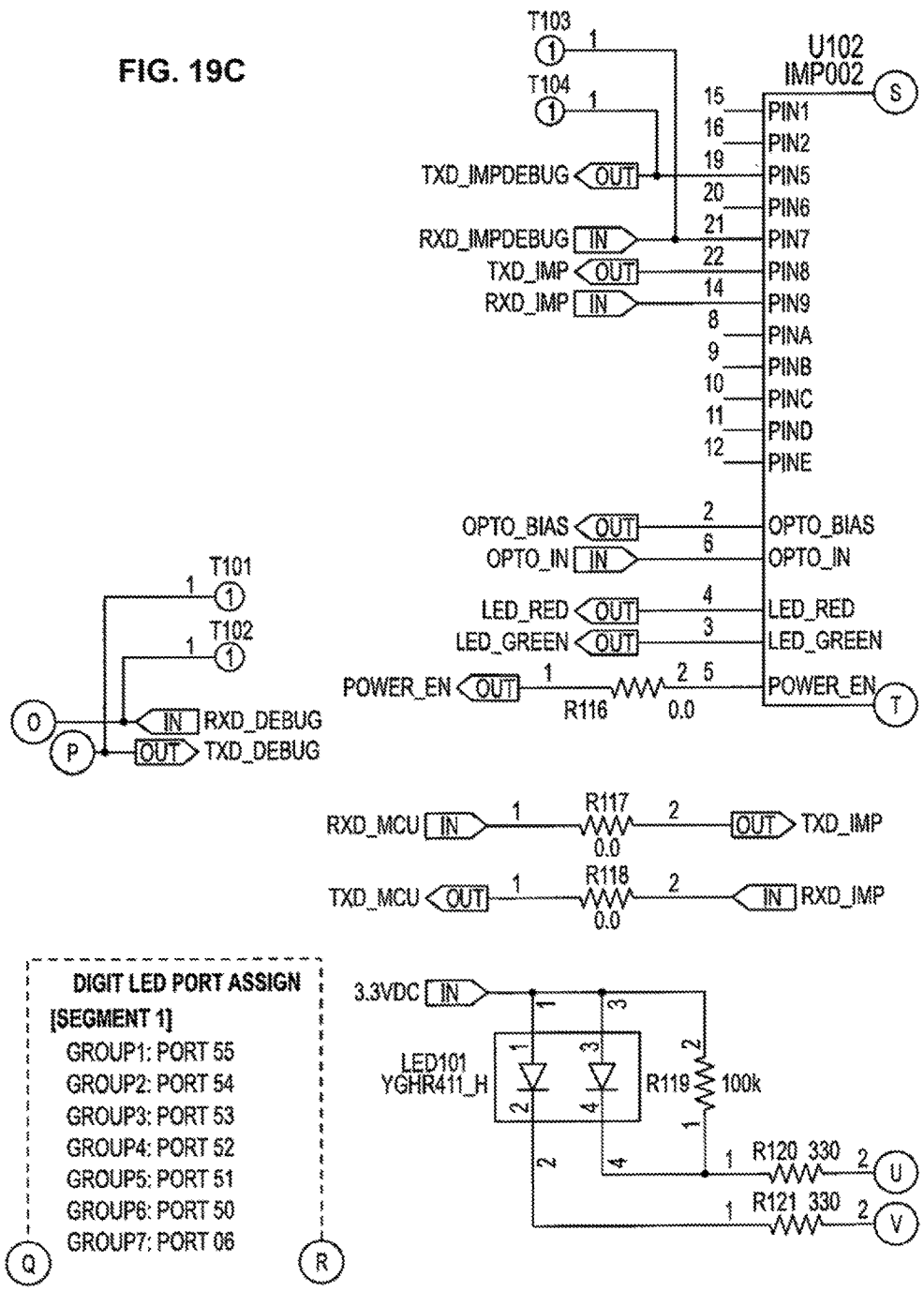

WINDOW AIR CONDITIONING APPARATUS AND CONTROLLER

CROSS-REFERENCE TO RELATED APPLICATIONS

This application claims priority to U.S. Provisional Pat. App. No. 61/921,343, filed Dec. 27, 2013, and entitled "Air Conditioning Apparatus and Controller." The entire contents of that application, including the appendices, are incorporated herein by reference.

INTRODUCTION

Conventional window air conditioning (A/C) units are known. However, such units typically have several disadvantages. For example, they are rarely programmable; they are not controllable from outside the immediate vicinity; and they do not react to external environmental conditions.

Exemplary embodiments described herein address the above and/or other deficiencies of existing A/C units and related control devices.

An exemplary embodiment pulls air in both from the front grill and from openings on the underside.

An exemplary embodiment blows air out from the top at, for example, a 60 degree angle away from the window. Blowing cold air out of the top, as is done in one or more exemplary embodiments, creates better air circulation throughout a room by pushing cold air up and warm air down.

As opposed to physical buttons, an exemplary embodiment may use capacitive touch sensors located behind the front face. The only visible interaction points may be pad prints on the plastic face that sit just in front of the capacitive sensors.

An exemplary aspect comprises an air conditioning apparatus comprising: (a) a controller comprising a microprocessor; (b) a wireless transceiver in communication with the microprocessor and operable to communicate over a wireless network with an application on a mobile device; (c) a compressor controlled by the controller; (d) a fan controlled by the controller; and (e) a front panel that allows a user to interface with the controller.

In one or more exemplary embodiments: (1) the front panel comprises a grill that provides air intake to the apparatus via circular openings; (2) the application enables a user of the mobile device to adjust settings for the apparatus; (3) the application enables a user of the mobile device to set a budget for energy usage of the apparatus; (4) the application communicates with the controller to change operation of the apparatus based on location of the mobile device; (5) the apparatus expels cooled air upward from a top portion; (6) the apparatus comprises fabric side panels that are configured to wrap around a roller component; (7) the application communicates with the controller to change operation of the apparatus based on a message transmitted by an environmental sensor; and/or (8) the application communicates with the controller to change operation of the apparatus based on a message transmitted by another wireless device.

Another exemplary aspect comprises a mobile device comprising a processor and a memory, the memory storing an application that enables a user of the mobile device to adjust settings for an air conditioning apparatus operable to communicate via a wireless network with the mobile device.

In one or more exemplary embodiments: (1) the application enables a user of the mobile device to set a budget for energy usage of the air conditioning apparatus; (2) the application communicates with the air conditioning apparatus to change operation of the air conditioning apparatus based on location of the mobile device; (3) the application communicates with the air conditioning apparatus to change operation of the air conditioning apparatus based on a message transmitted by an environmental sensor; and/or (4) the application communicates with the air conditioning apparatus to change operation of the air conditioning apparatus based on a message transmitted by a third wireless device different from the air conditioning apparatus and the mobile device.

Another exemplary aspect comprises a server in communication via a first wireless network with a mobile device and in communication via a second wireless network with an air conditioning apparatus, the mobile device storing an application that enables a user of the mobile device to send commands relating to the air conditioning apparatus to the server, and wherein the server is operable to transmit corresponding commands to the air conditioning apparatus.

In one or more exemplary embodiments: (1) the application communicates at least one location of the mobile device to the server, and the server then transmits a command, based on the at least one location of the mobile device, regarding operation of the air conditioning apparatus; (2) the server is in communication with an environmental sensor, and the application communicates instructions to the server to change operation of the air conditioning apparatus based on data transmitted to the server by the environmental sensor; and/or (3) the server is in communication with a third wireless device different from the air conditioning apparatus and the mobile device, and the application communicates instructions to the server to change operation of the air conditioning apparatus based on data transmitted to the server by the third wireless device.

The above and other features of exemplary aspects and embodiments will be apparent from the drawings and detailed description provided herein.

DETAILED DESCRIPTION OF CERTAIN EXEMPLARY EMBODIMENTS

In an exemplary implementation, when a button is pushed, an LED (e.g., blue or white) near the sensors behind the plastic face may be lit and then dim or turn off. The LED(s) may be timed to turn off after a certain time has elapsed (say, 30 seconds). Brightness may be user-configurable.

The control buttons may include: On/Off, Mode, Fan, Up, Down, and ECO reset. ECO Reset resets an indicator to replace the filter, and may be a physical button and/or part of an application interface used in a remote control device (e.g., a smart phone). Next to those buttons may be indicators that tell a user which mode is being used. These indicators may be pad prints on the front face with LED lights that shine through the plastic. These indicators may include: Cool, Eco, Fan, High, Medium, and Low. "Eco" may have other labels, such as "Energy Saver." Any or all of this information may be viewable on the unit and/or on an application (App) running on a mobile device, since exemplary embodiments may comprise a Wi-Fi-to-Internet-to-mobile network communication unit (see, e.g., Appendix 1 of U.S. Provisional App. No. 61/921,343).

As opposed to an LCD screen on the unit, an exemplary embodiment may have an LED screen (an array of LEDs mounted directly to the PCB) which will shine through the front face to indicate the set temperature in either Fahrenheit or Celsius.

Through the App, a user may dictate whether the LEDs show actual temperature or set temperature. In an exemplary embodiment, when the LED screen is off, there are no visible markings on the plastic front plate.

Figure 4:
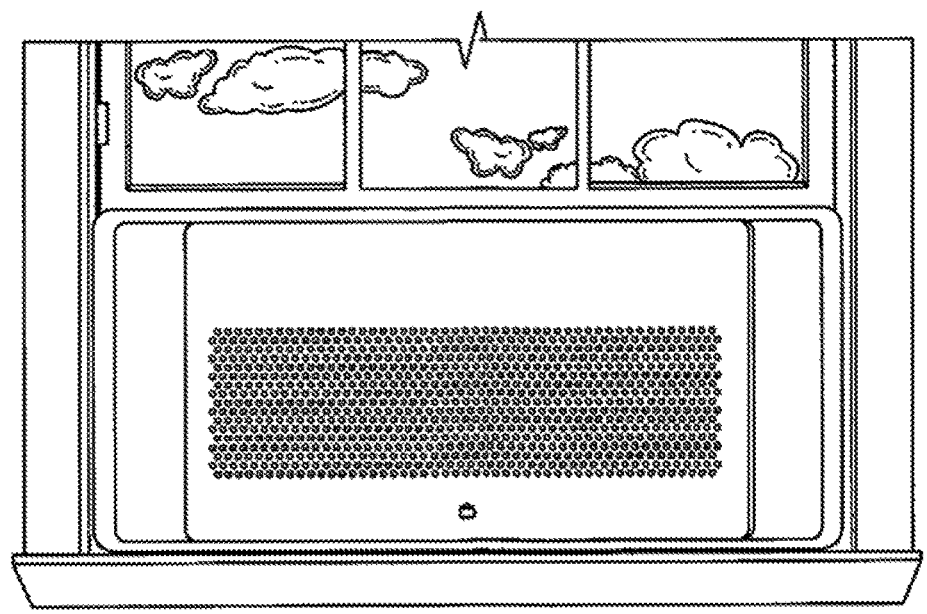
FIGS. 4-5 and 7 depict exemplary views of a front panel.
Figure 5:
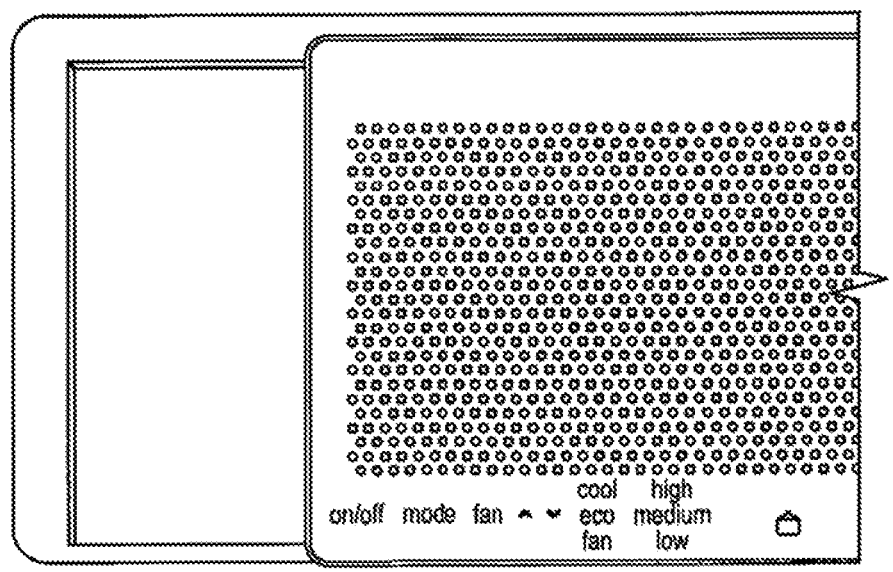
Figure 6:
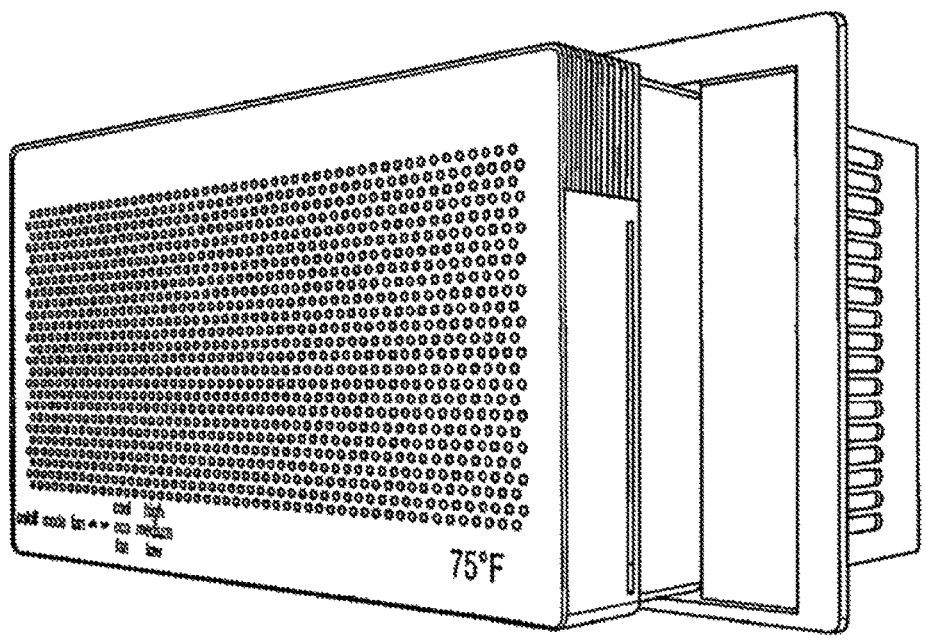
FIG. 6 provides a corner view of an exemplary air conditioning unit.
Figure 7:
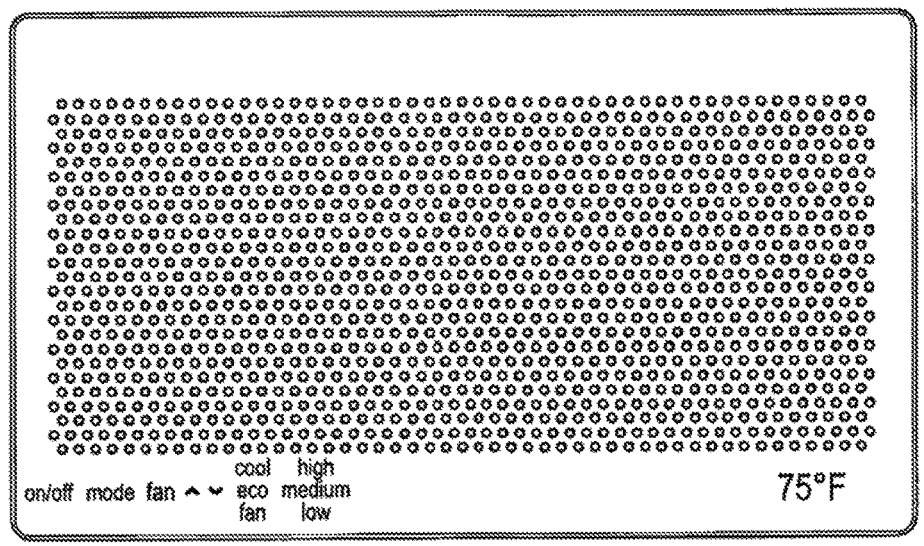

An exemplary embodiment may use a coated, waterproof fabric for side curtains. The purpose of this is to tie the design in more with home decor and make it less industrial looking. The fabric may be on a mechanism like a curtain, where it has constant back pressure, achieved through use of internal springs. The user may pull the side curtain out, affix the plastic frame to the window frame, and the mechanism will inherently eliminate any slack in the fabric. See FIGS. 4-5 and 15.

An exemplary embodiment may have a removable, reusable filter that sits directly in front of the air intake. The filter may slide in from the side.

The AC unit may have a blinkup window, allowing a mobile device to send light pulses containing encoded setup information to the embedded imp module, which will connect to the Internet via Wi-Fi.

While the invention and embodiments are not limited to specific components or construction, an exemplary parts list is provided in Appendix 2 of U.S. Provisional App. No. 61/921,343, and schematics for exemplary electronic components are depicted in FIGS. 19-22.

APP UI

Figure 1:
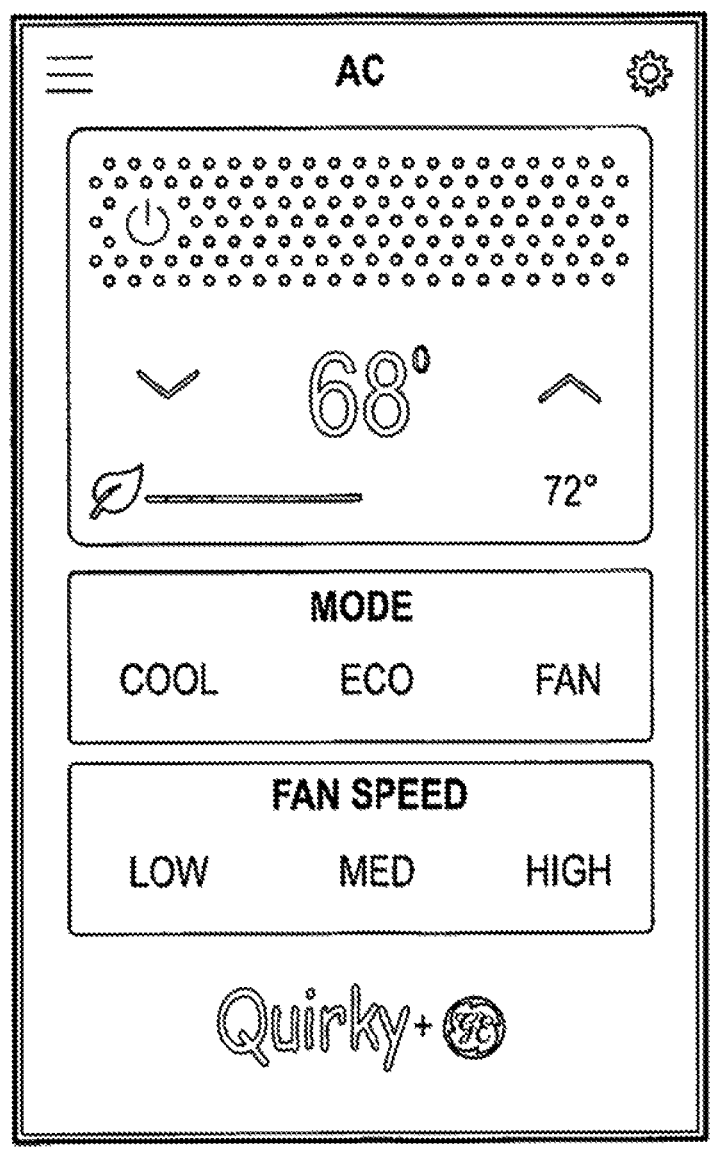
FIGS. 1-3 depict exemplary user interfaces of a corresponding mobile application.
Figure 3:
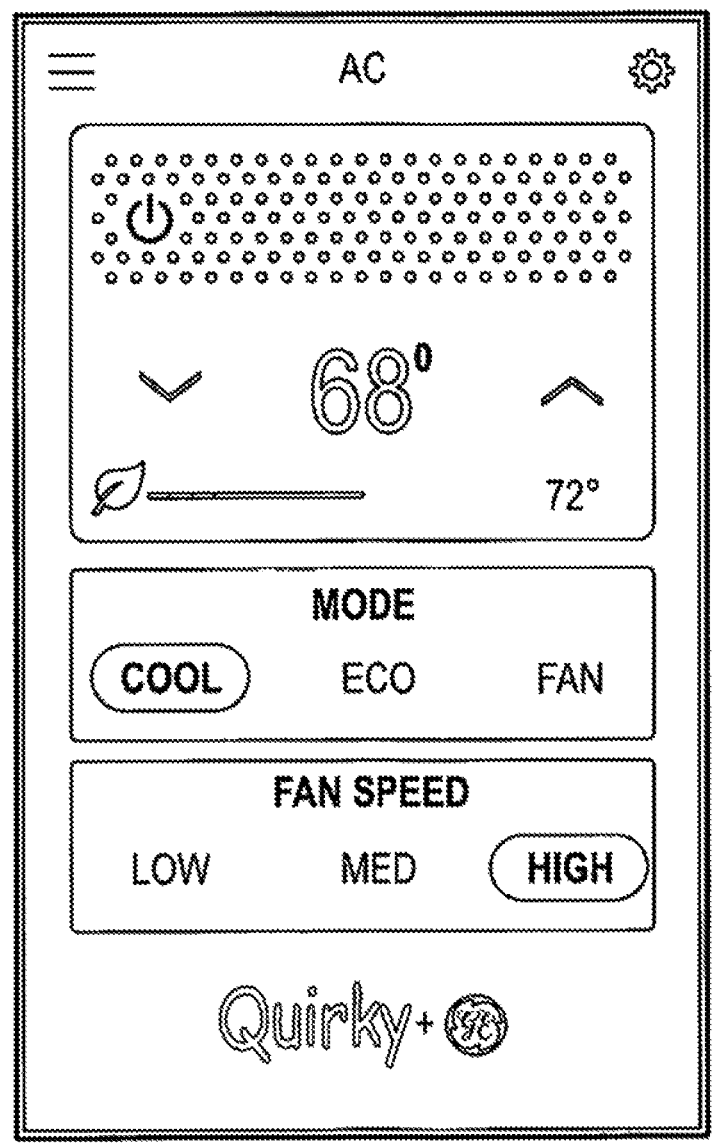

The two vertical screens depicted in FIGS. 1 and 3 show an exemplary main interface to control the AC unit, and they represent an on and an off state.

Figure 2:
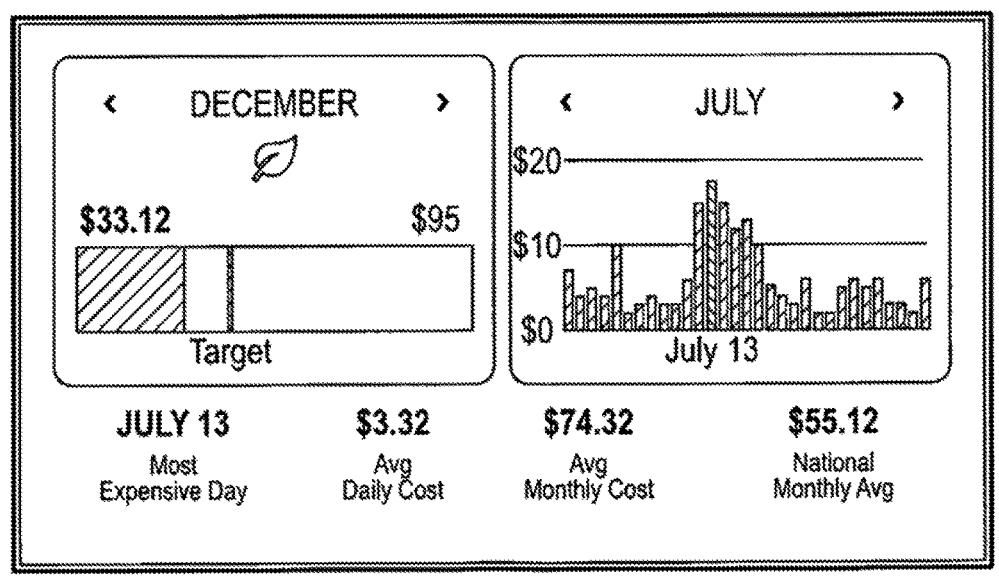

The horizontal landscape screen depicted in FIG. 2 is a Wink design pattern wherein if a user turns the phone sideways information about usage patterns is displayed. In the case of the AC, the user may have a target amount of money the user wants to spend in a given month, and so the user would see current status relative to that target. The user may set that target on a separate settings screen (not shown) and have the option to send an alert and/or turn the AC unit down or off if near or on the target dollar amount specified. The AC may be controlled algorithmically to hit this target, taking into account factors such as when the user is normally home, and the weather forecast.

Other smart features may include learning about user behavior and location to smartly control and adjust the AC for optimal temperature and efficiency. Also, the potential to treat a home more like central air if the user has more than one smart AC unit in the same home. If coupled with a well-placed Spotter (an environmental sensor produced by Quirky, Inc.) or other environmental sensor, two or more AC units may more accurately cool the home or living space.

An App UI Main Screen may have the functionality described below.

Figure 8:
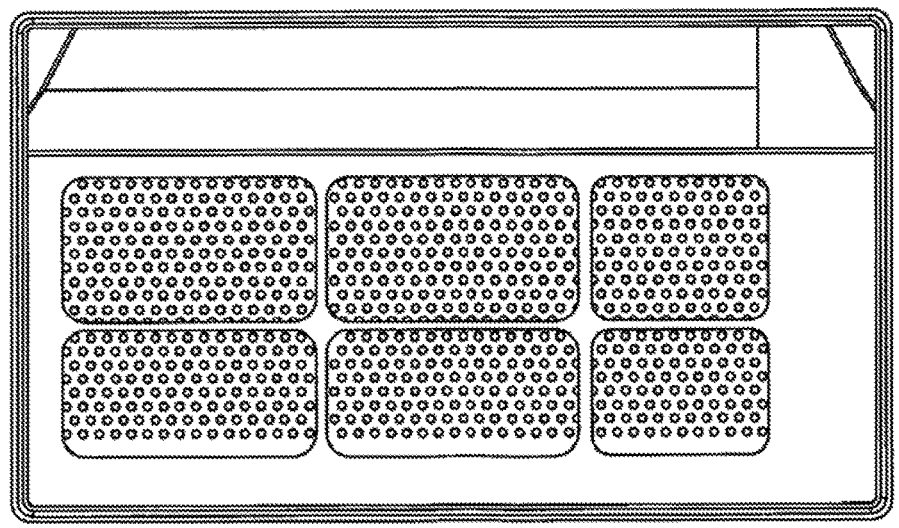
FIG. 8 depicts an exemplary back view of a front panel.
Figure 9:
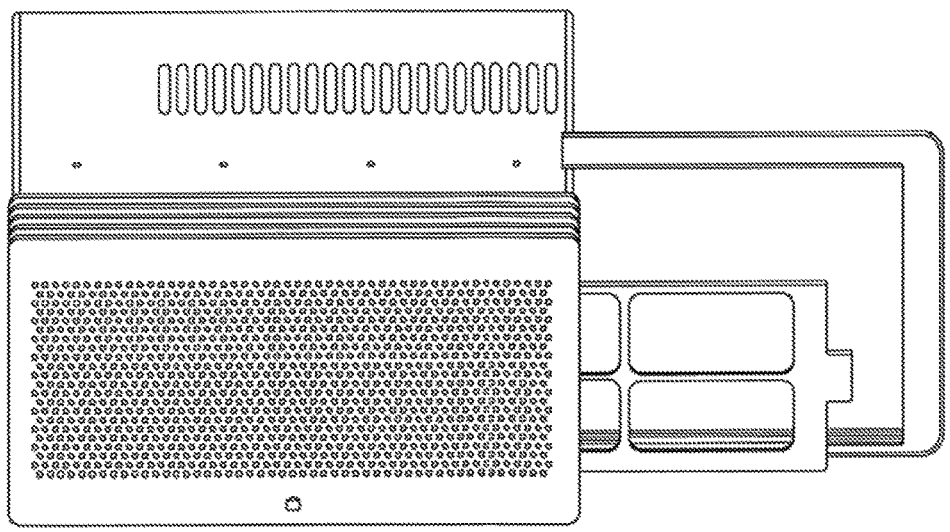
FIG. 9 depicts an exemplary view of a front panel, with a filter and wing extended.
Figure 10:
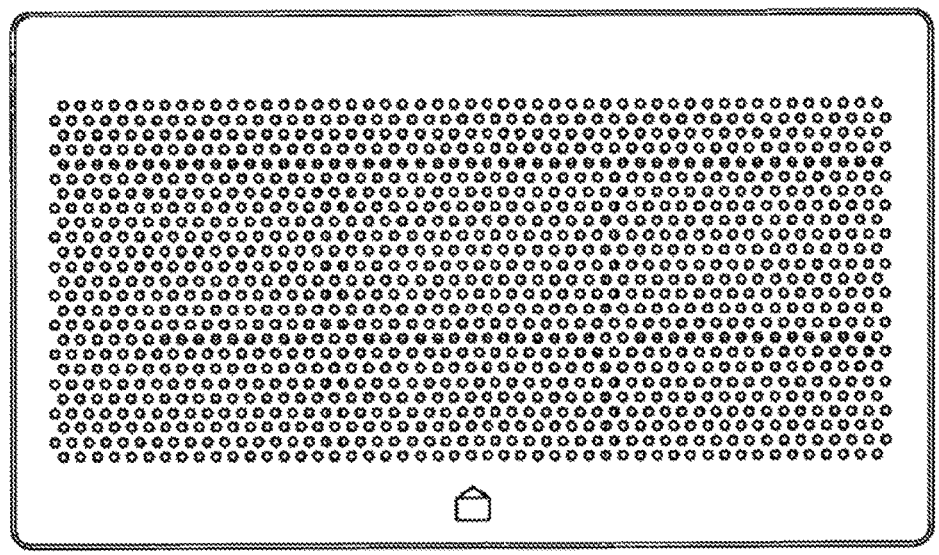
FIG. 10 depicts an exemplary front grill of a front panel.
Figure 11:
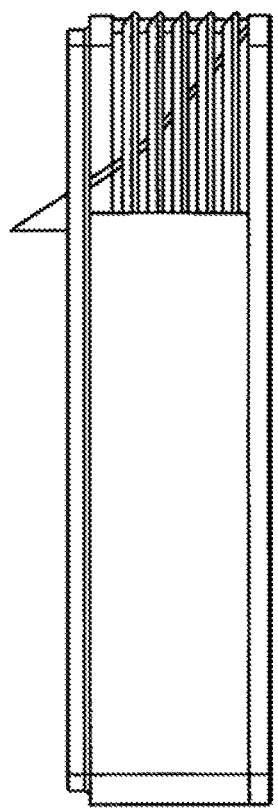
FIG. 11 depicts an exemplary side view of a front panel.
Figure 12:
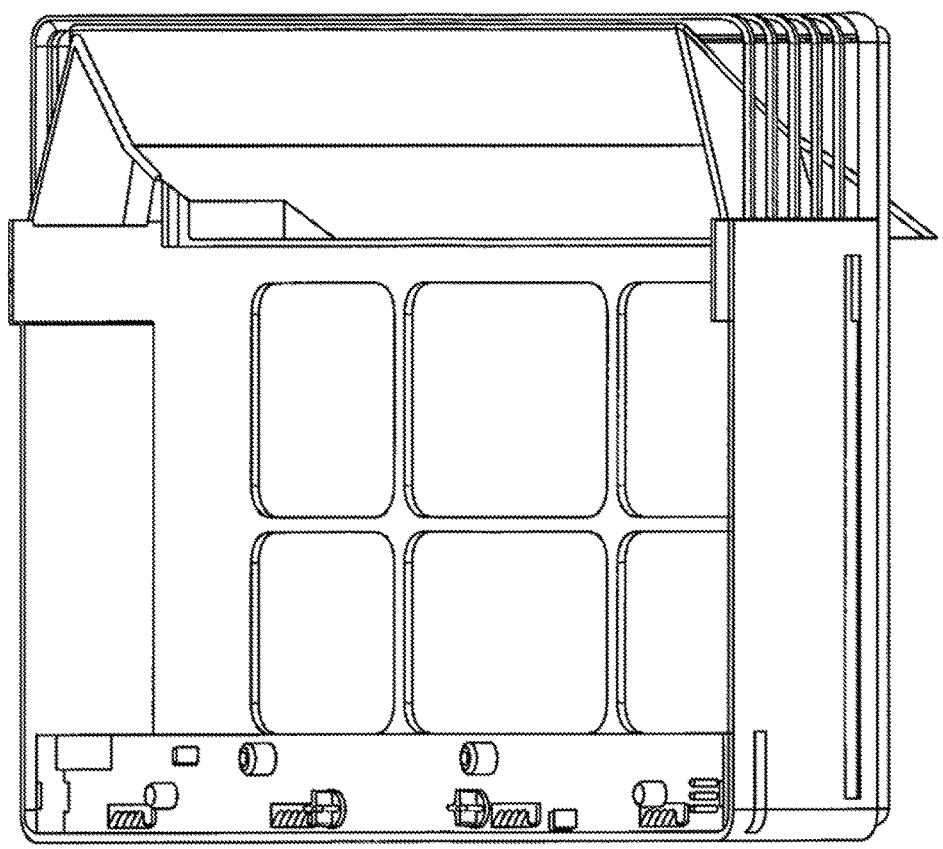
FIG. 12 depicts a front panel, showing an electronics housing at the bottom.
Figure 13:
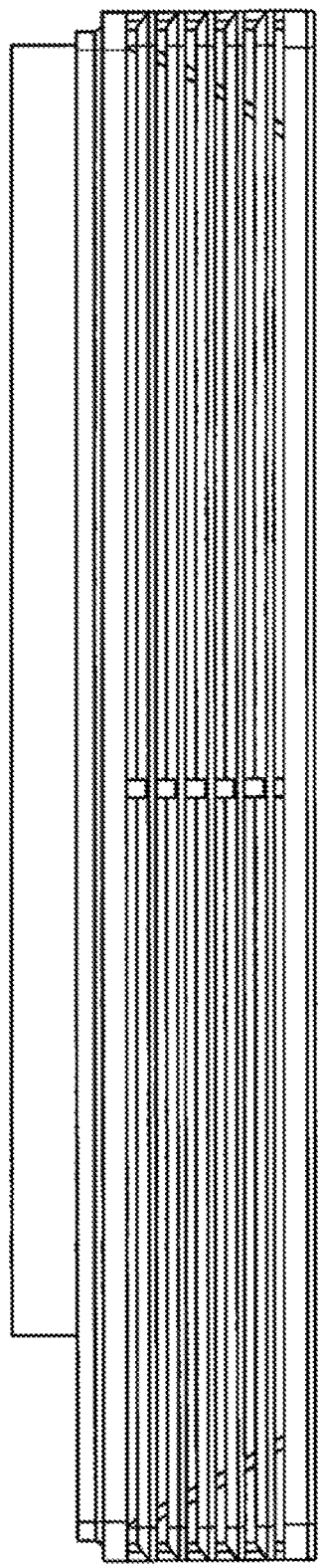
FIG. 13 depicts an exemplary top view of a front panel.
Figure 14:
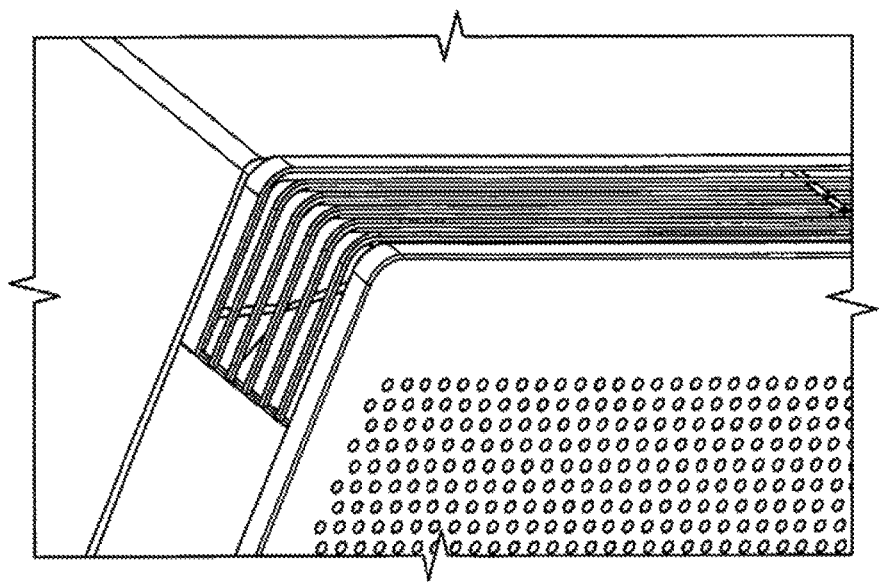
FIG. 14 depicts an exemplary view of a front panel, showing more detail regarding the vents.
Figure 15:
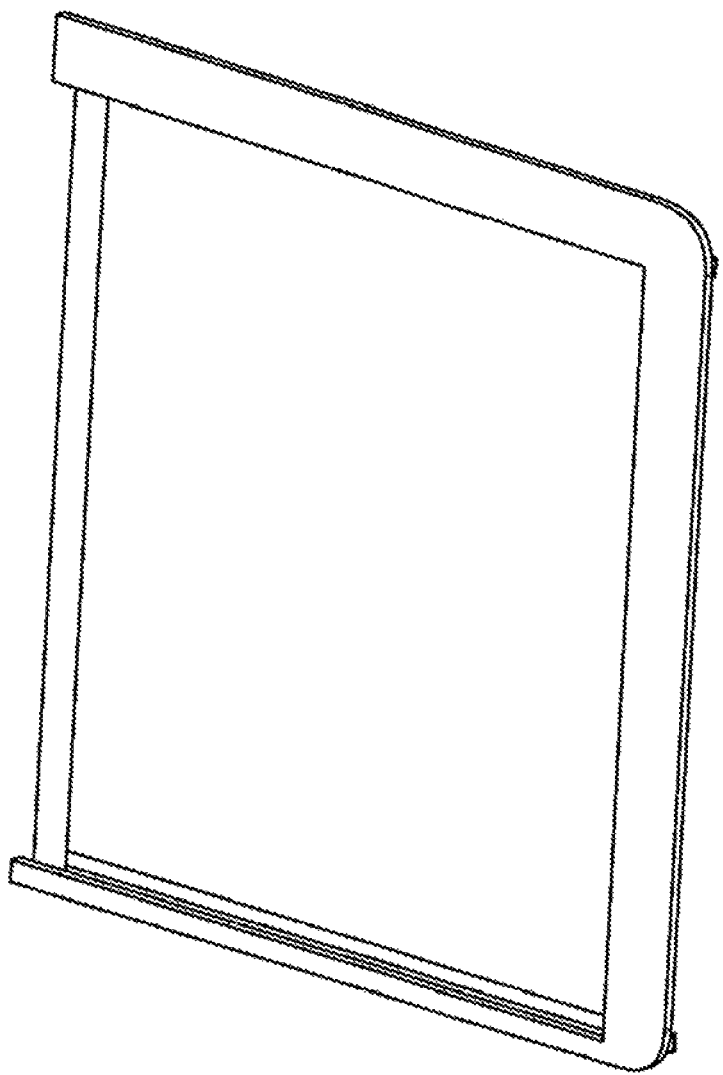
FIG. 15 depicts an exemplary view of a wing used with a front panel.
Figure 16:
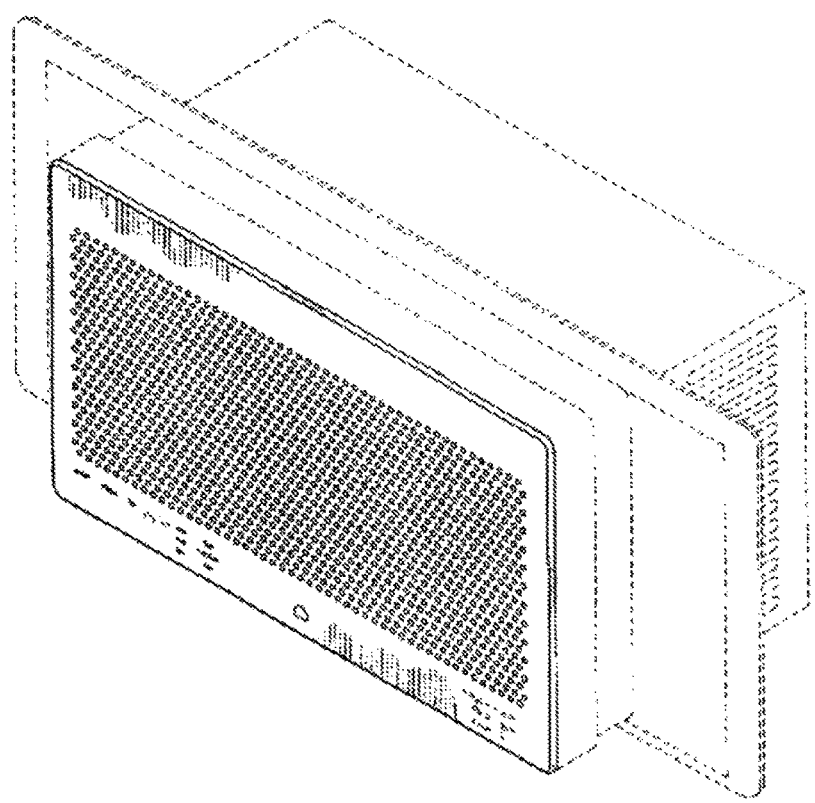
FIGS. 16-18 provide further views.
Figure 17:
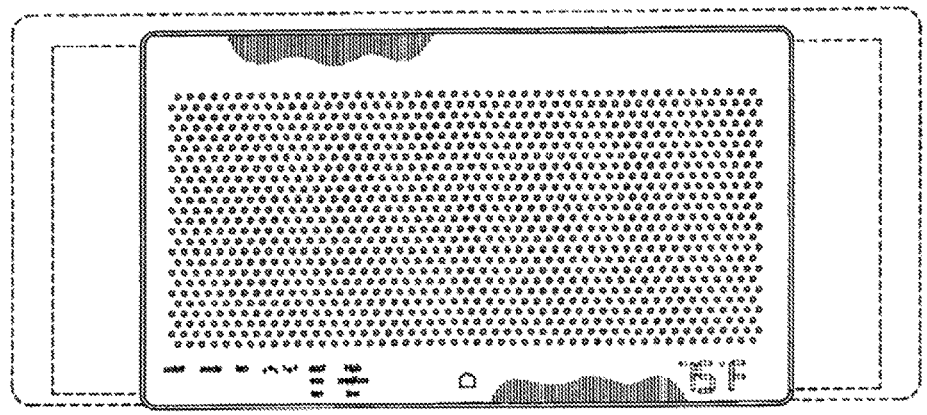
Figure 17:
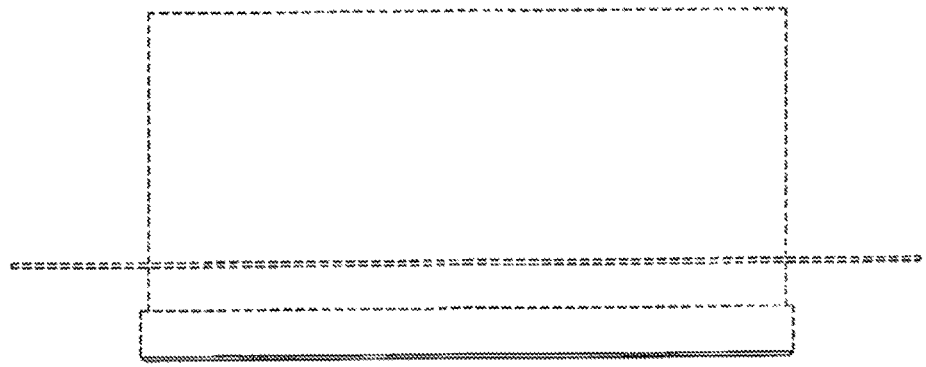
Figure 18:
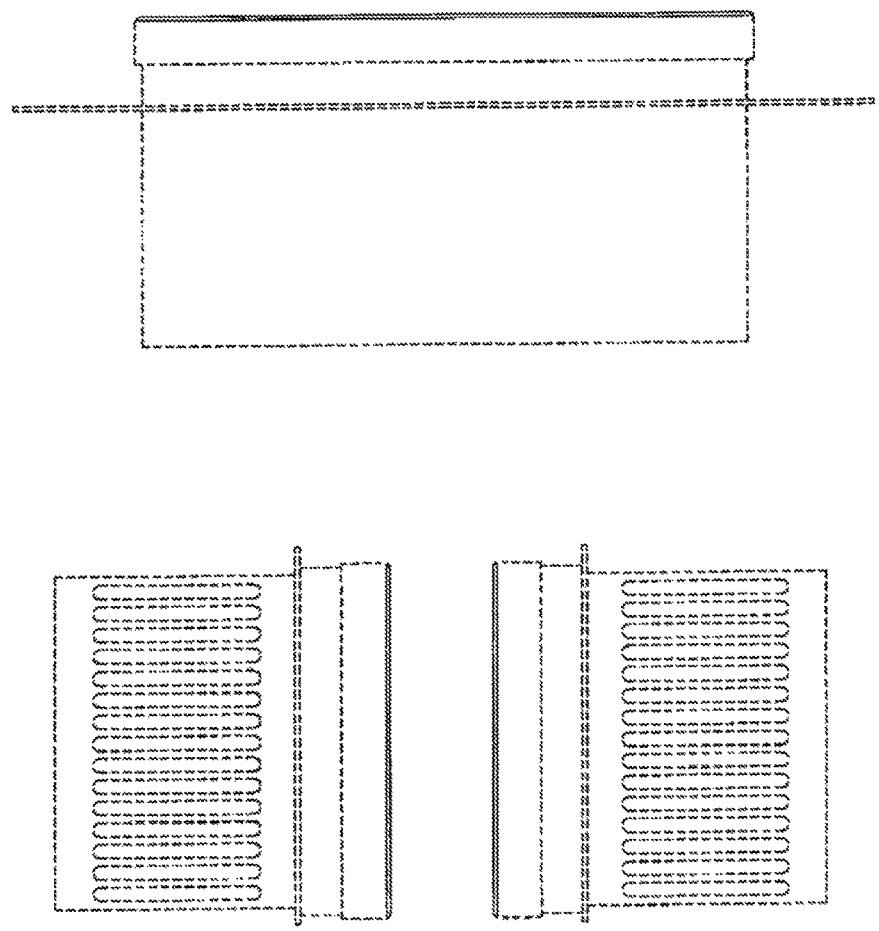
Figure 19A:
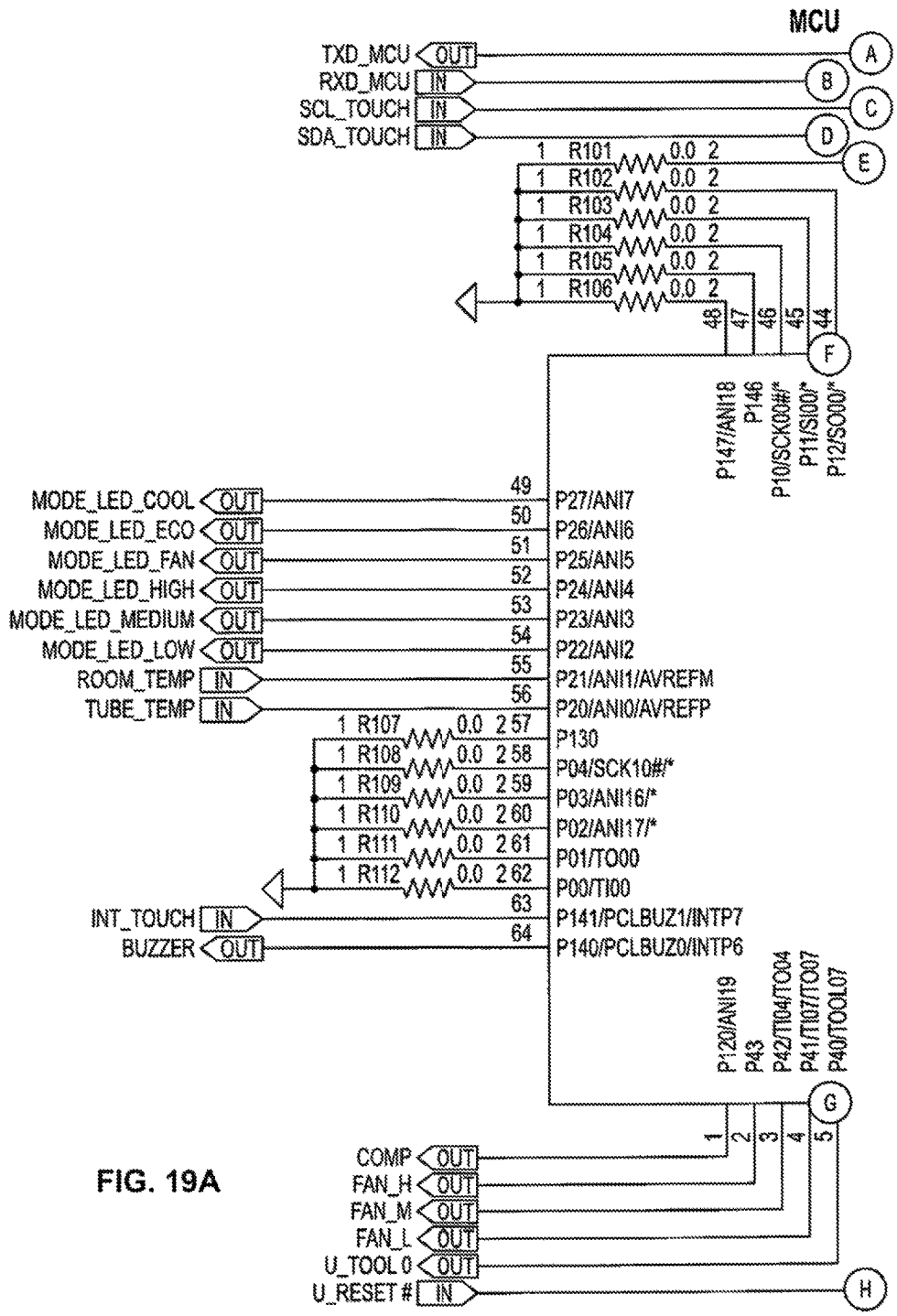
FIGS. 19-22 provide exemplary schematics.
Figure 19B:
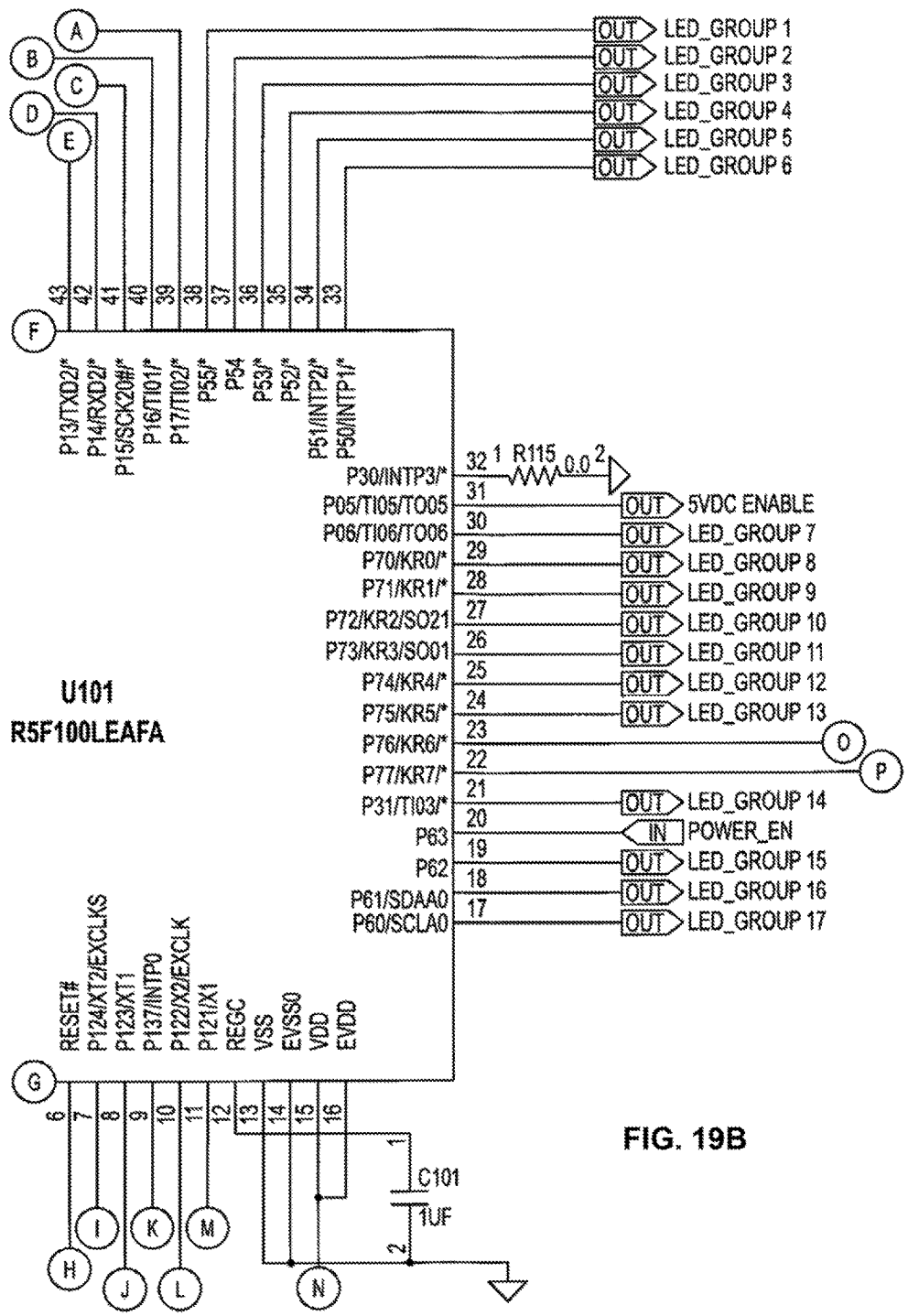
Figure 19D:
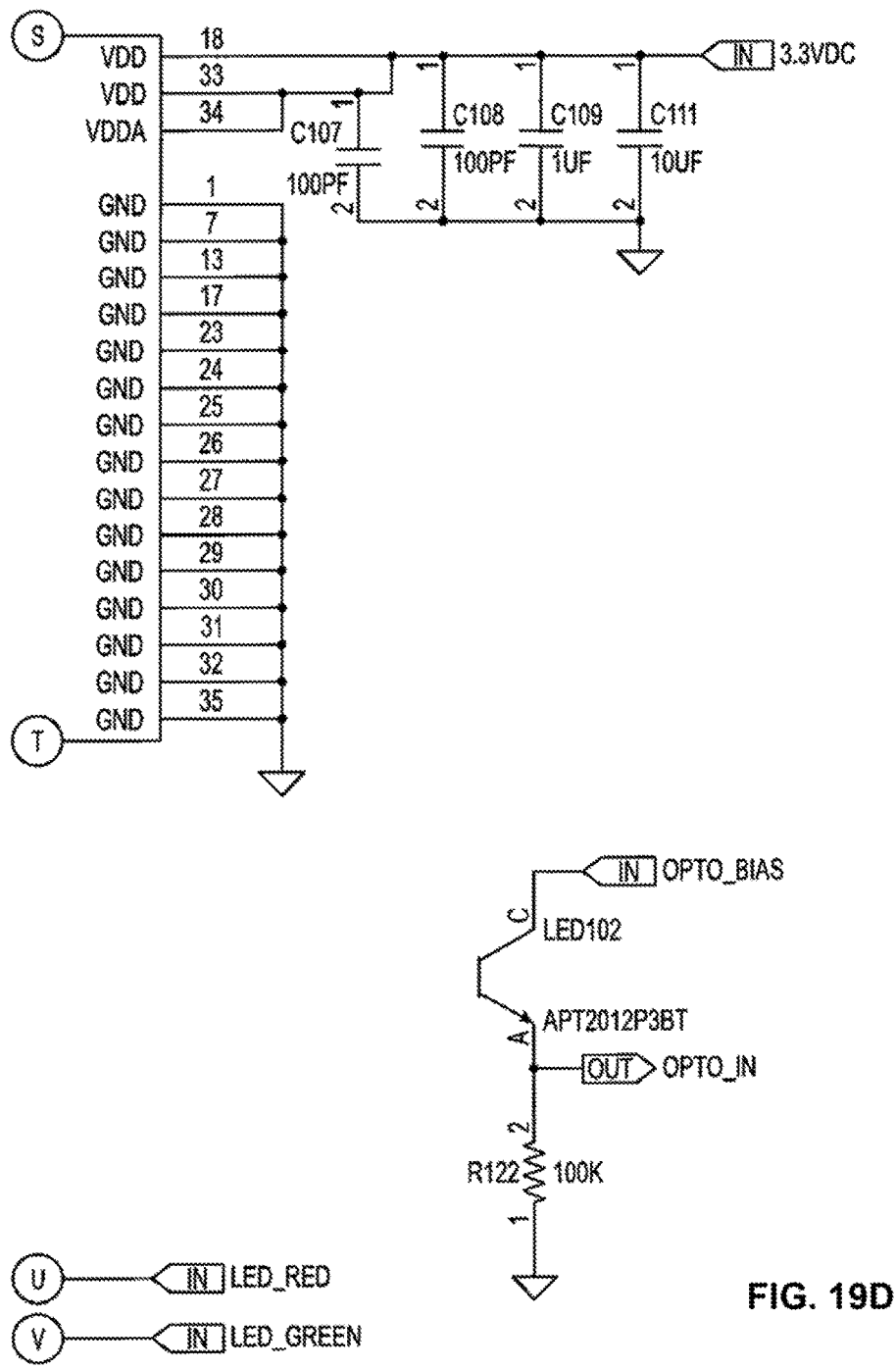
Figure 19E:
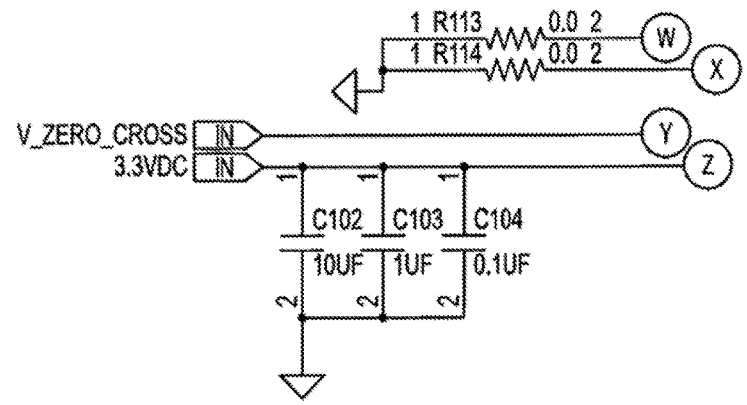
Figure 19E:
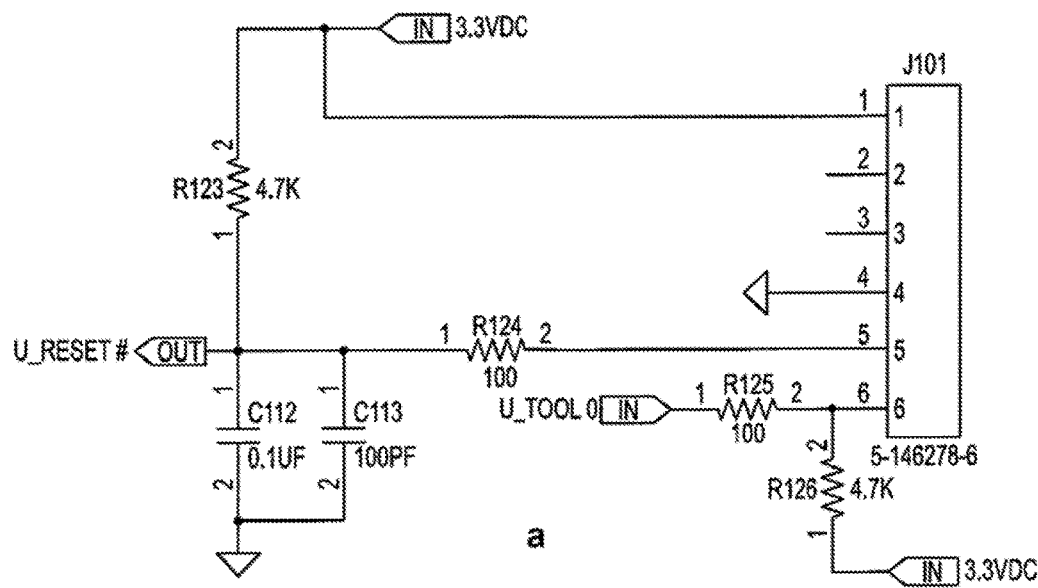
Figure 19F:
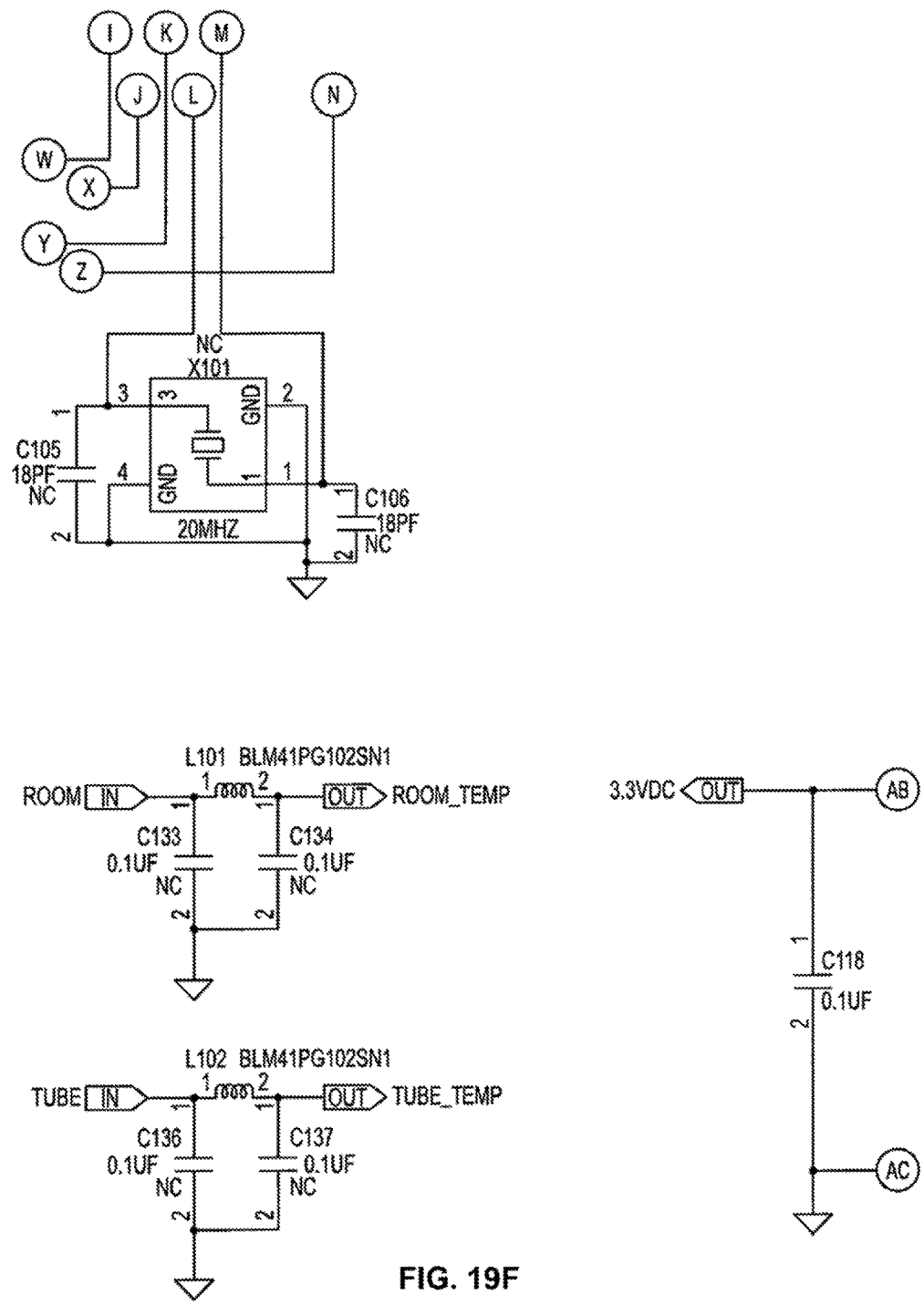
Figure 19G:
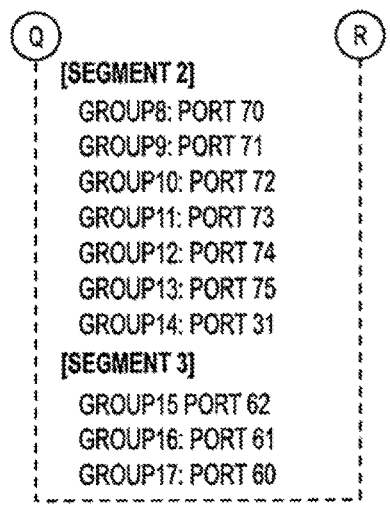
Figure 19G:
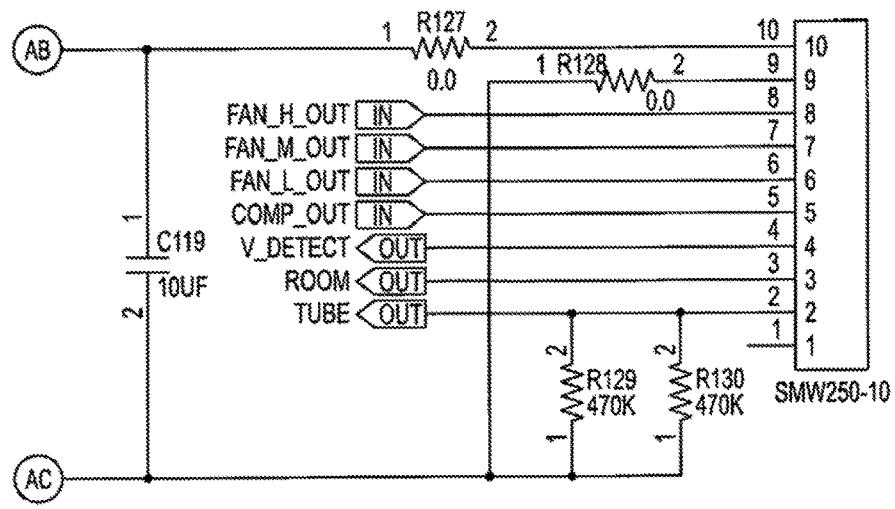
Figure 20A:
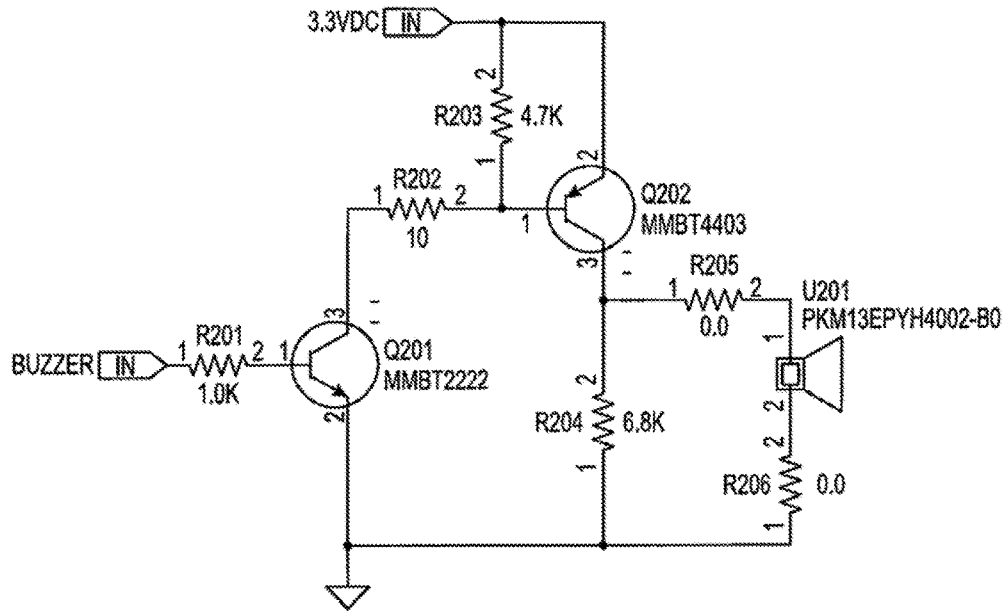
Figure 20A:
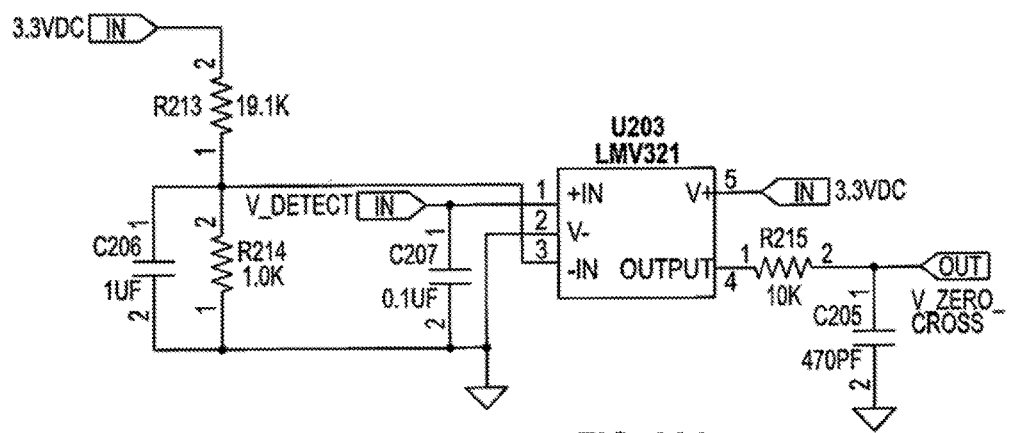
Figure 20B:
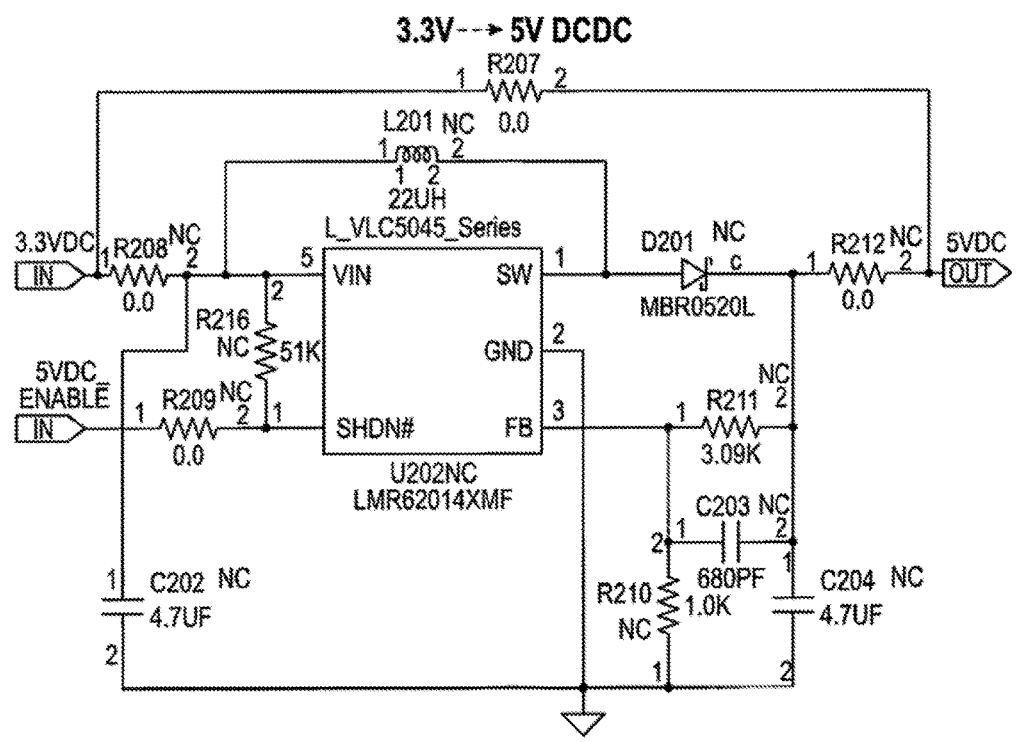
Figure 20B:
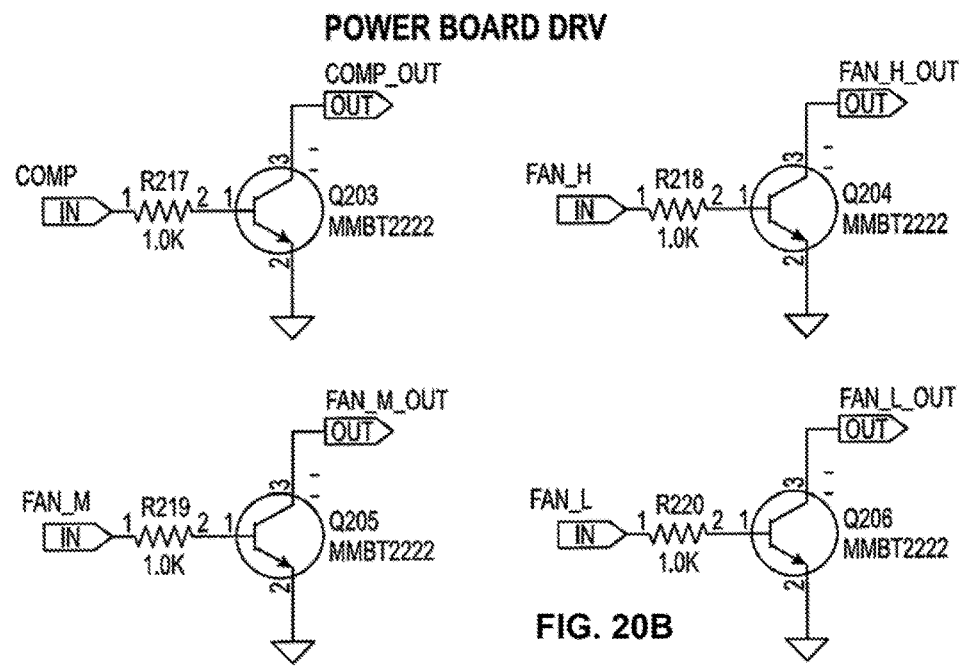
Figure 21A:
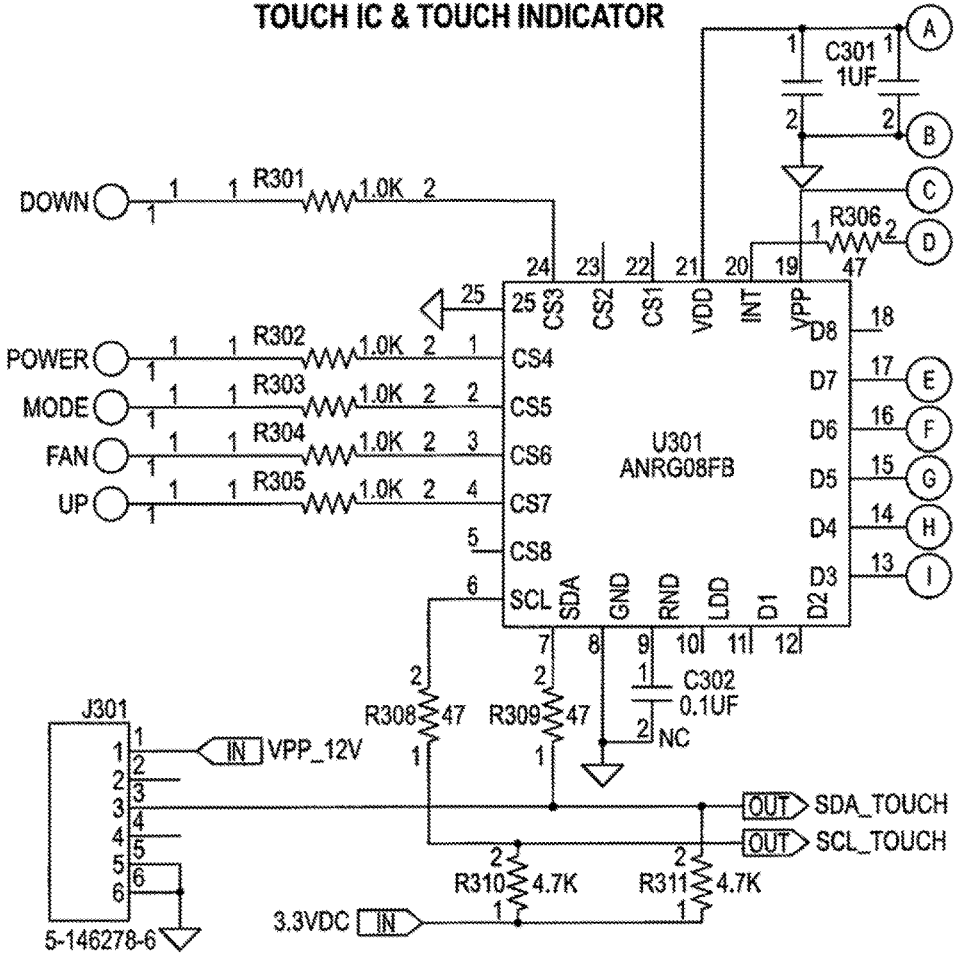
Figure 21A:
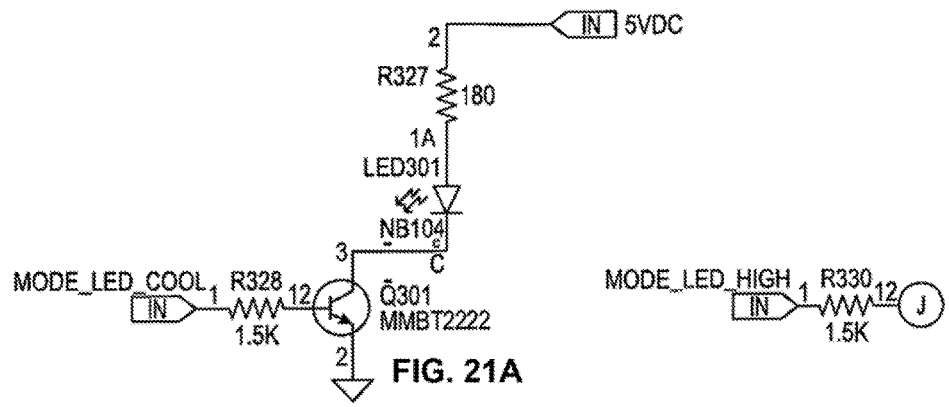
Figure 21B:
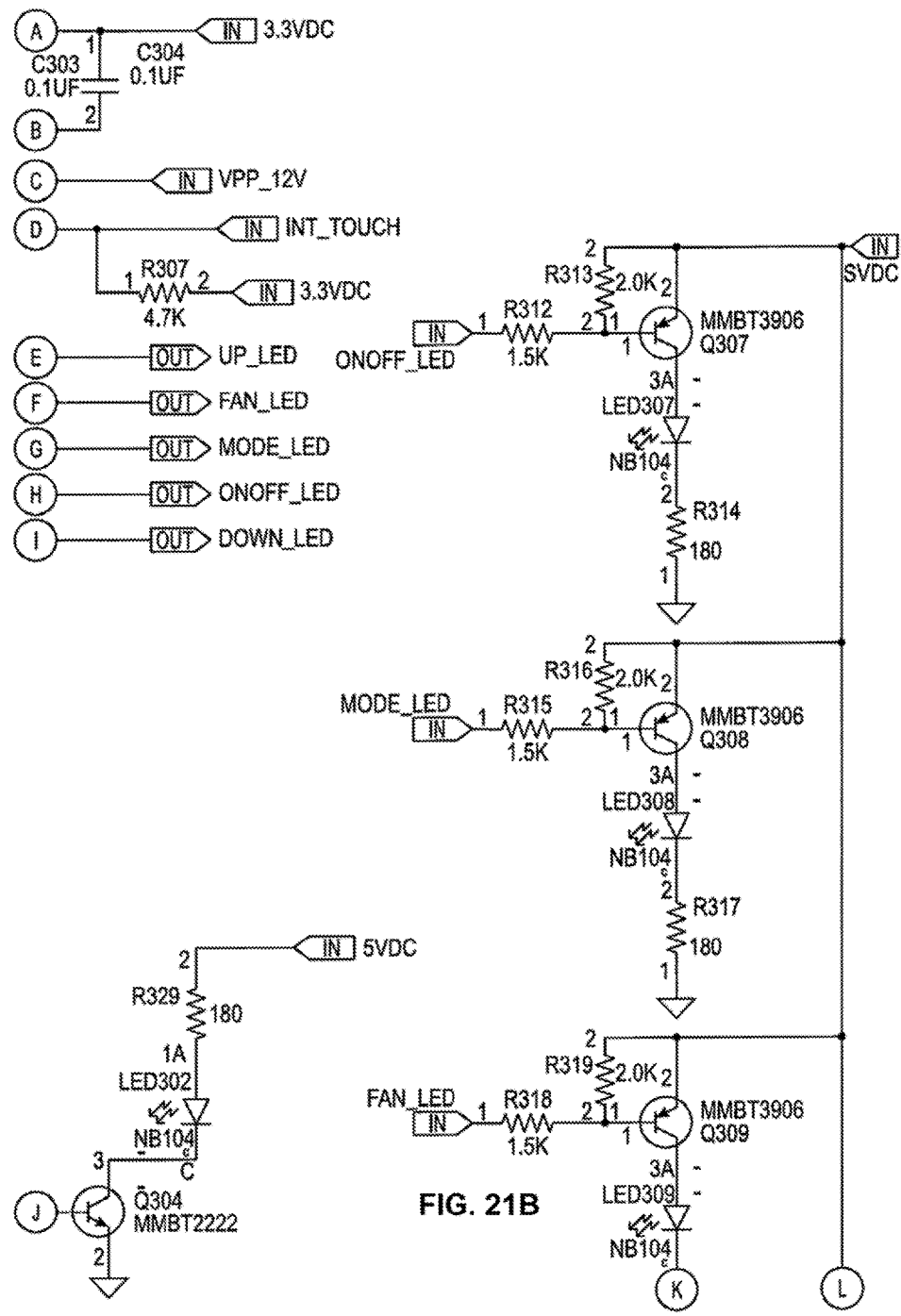
Figure 21C:
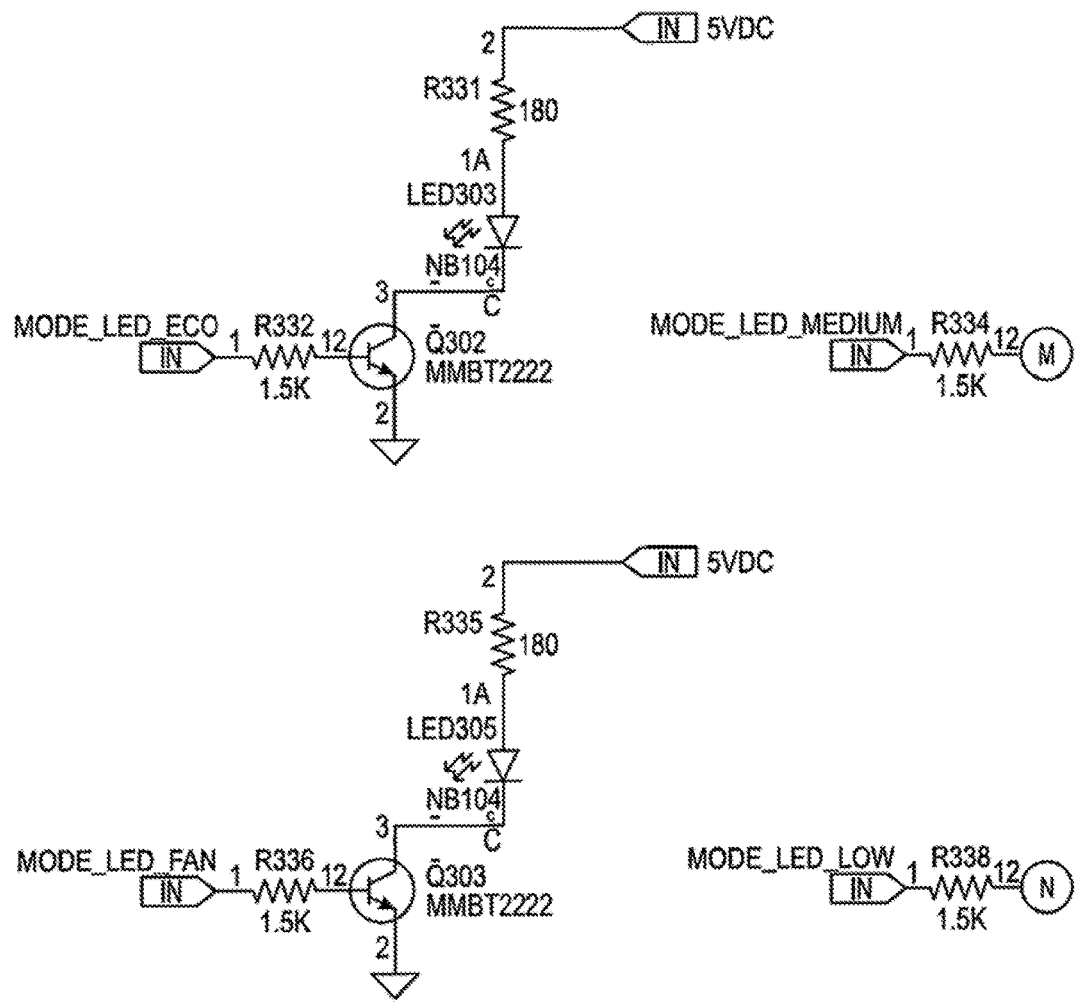
Figure 21D:
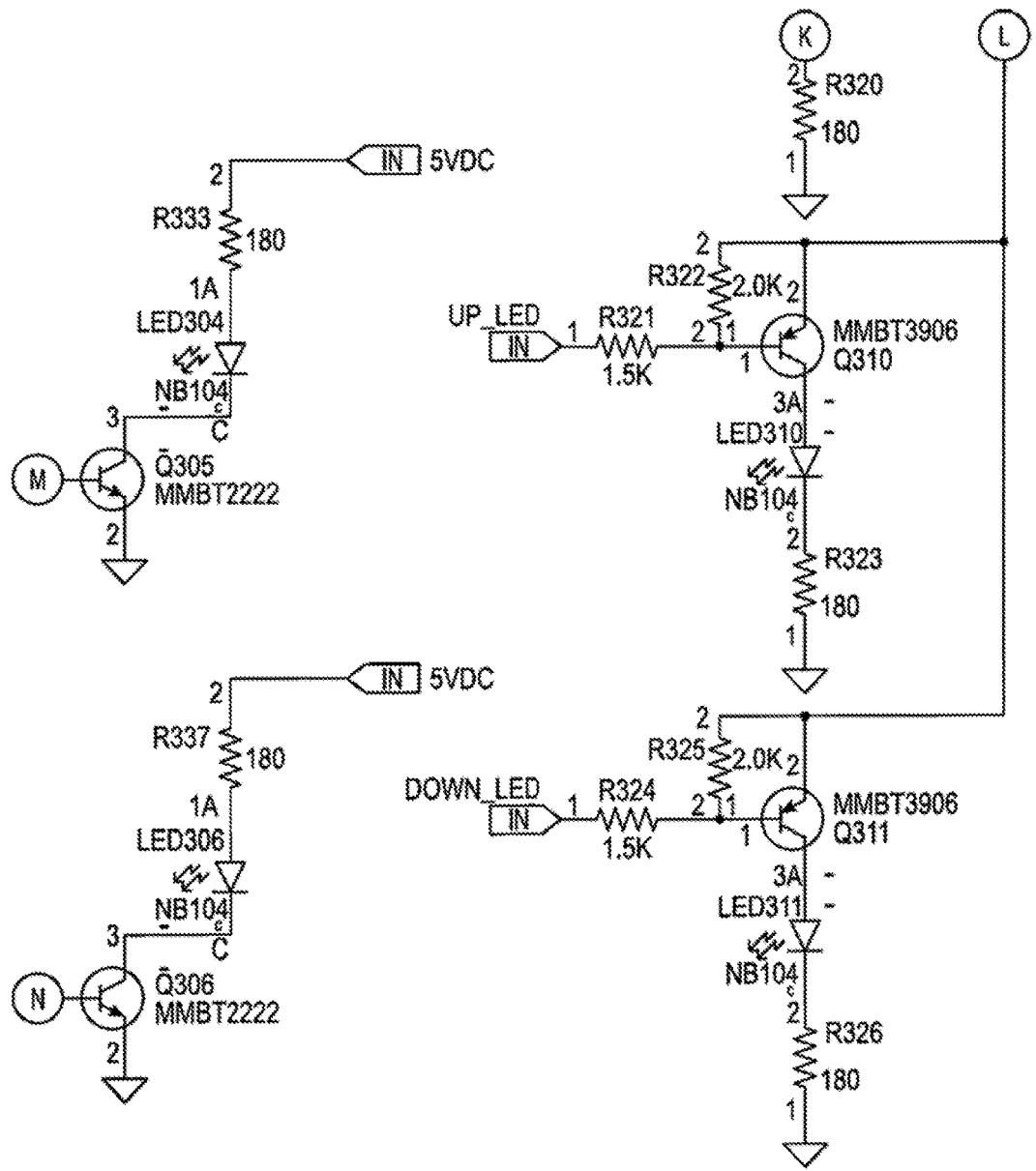
Figure 22A:
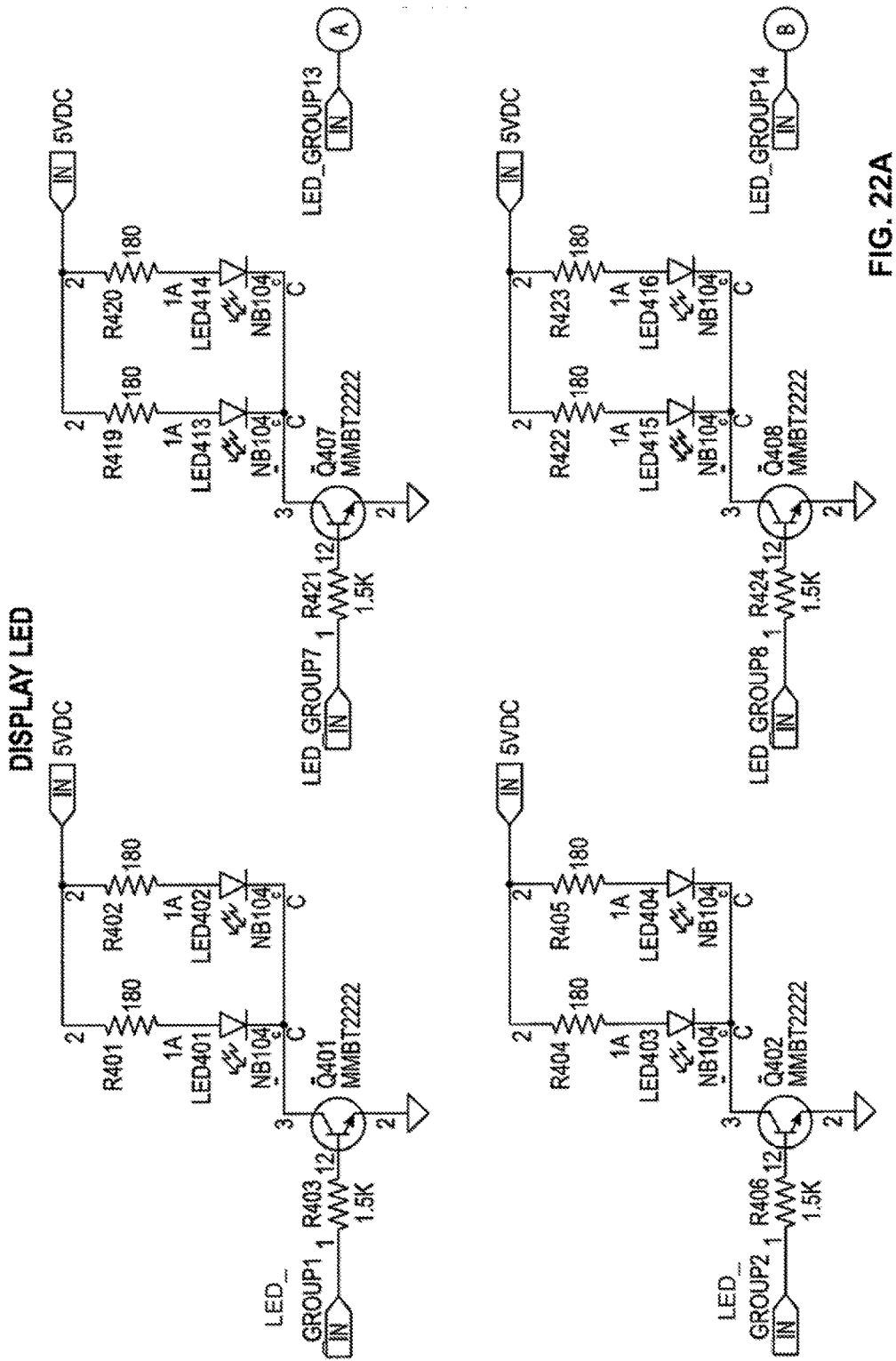
Figure 22B:
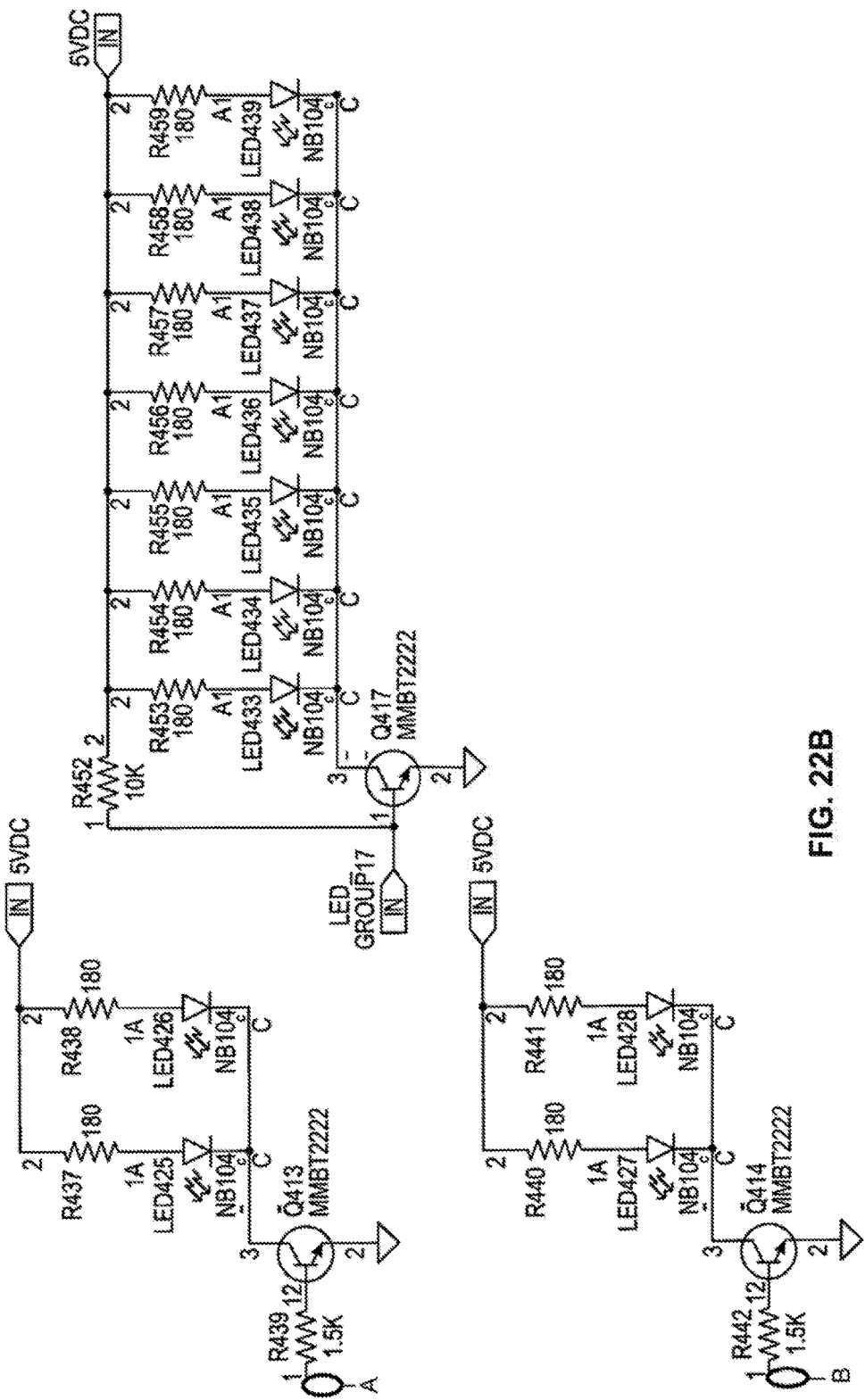
Figure 22C:
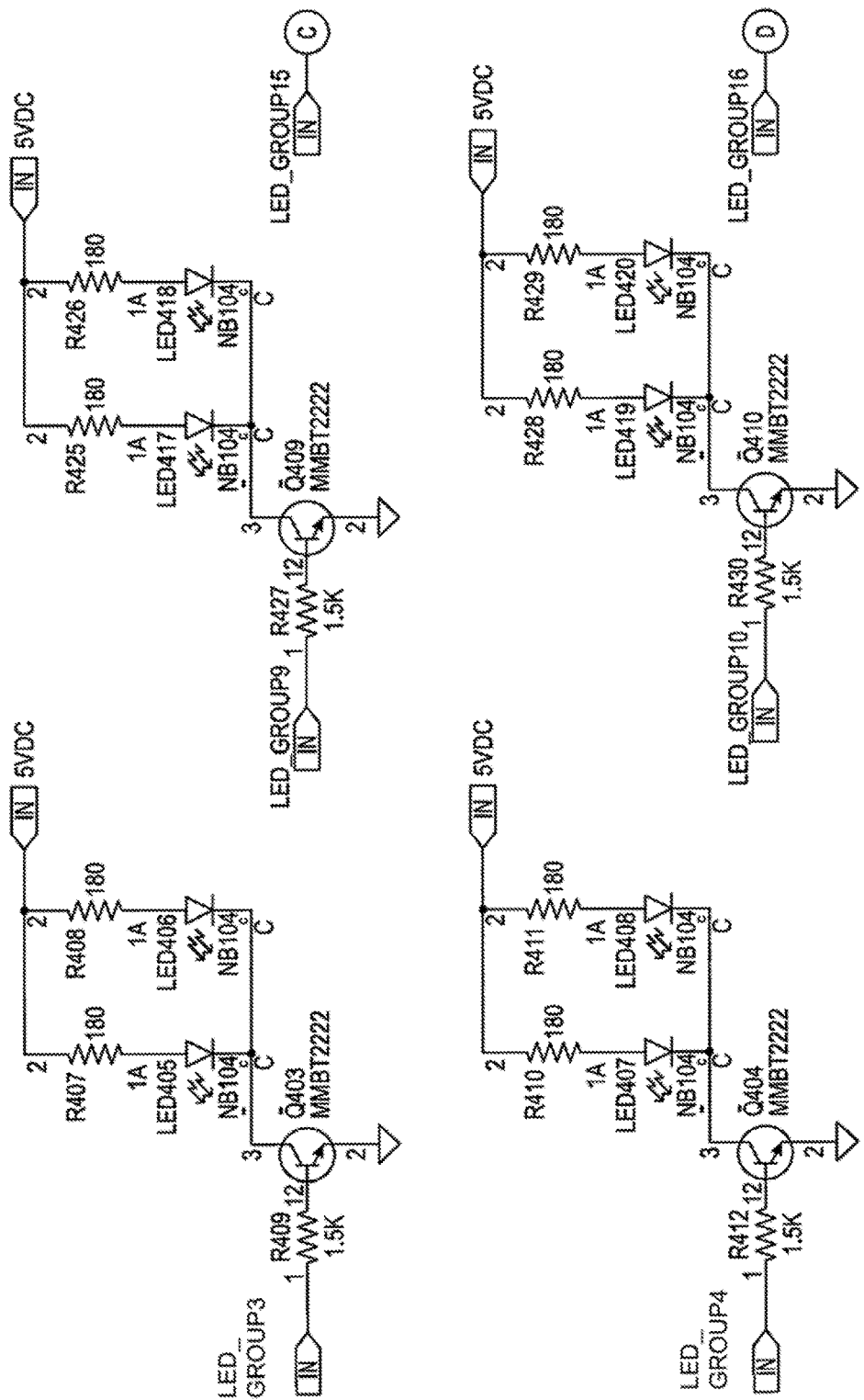
Figure 22D:
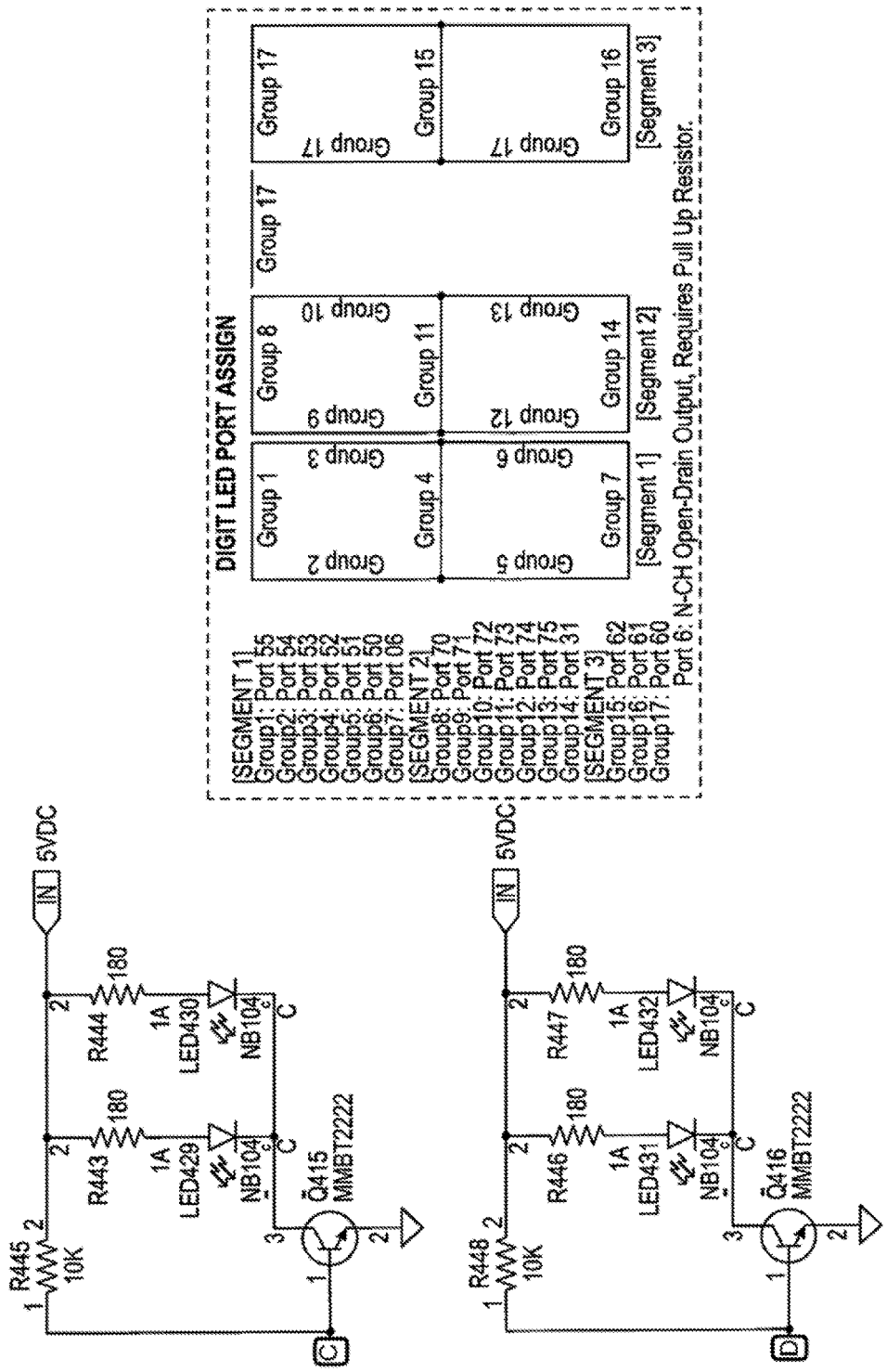
Figure 22E:
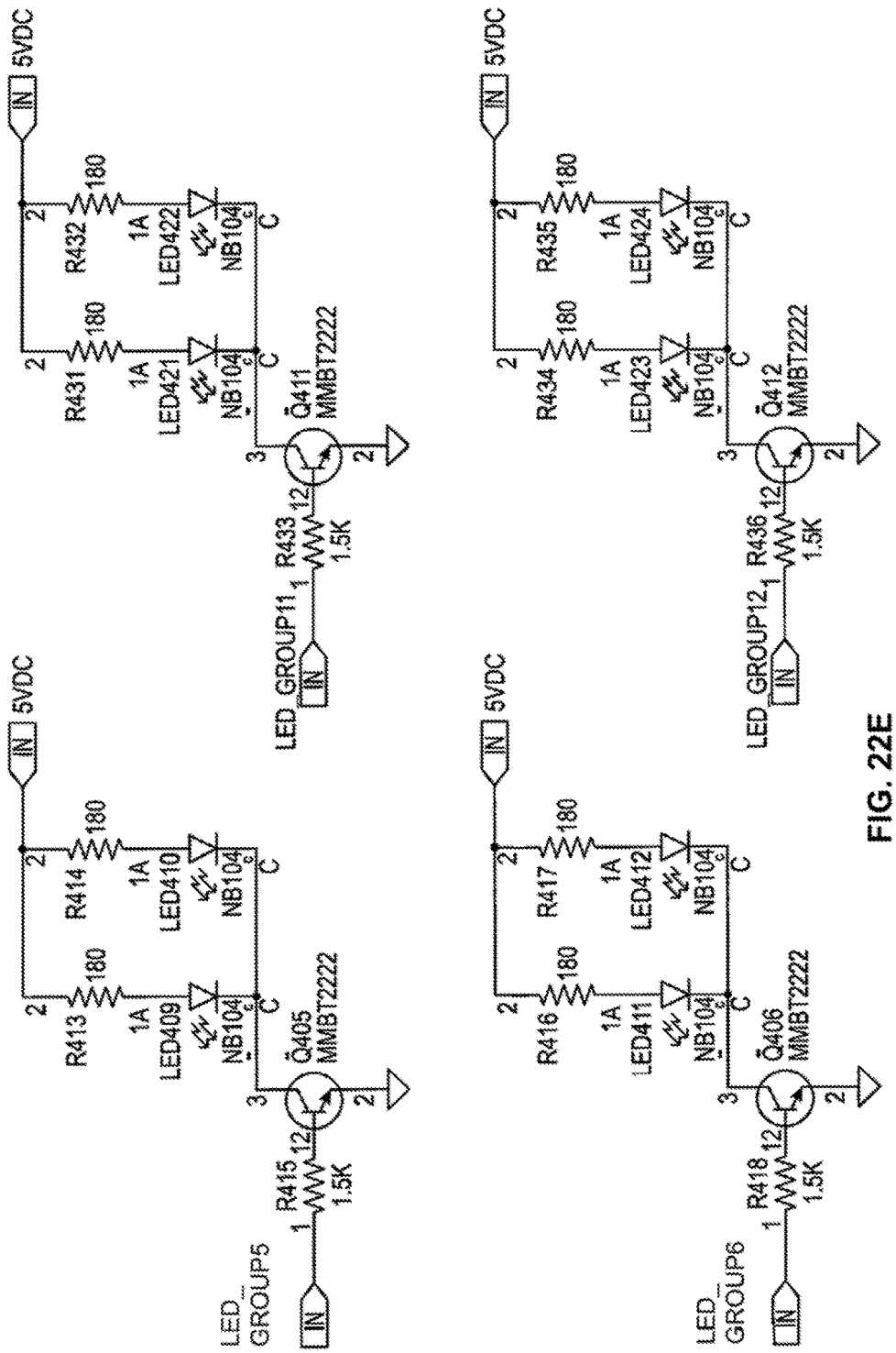

Display the current "set" temperature the AC is working towards
   Ability to adjust warmer or colder by degrees
A static display of the actual current temperature of the room
   this is the same as the default temp shown on the corner of the AC unit
Master on/off switch
A mode selector to switch between Cool/Eco/Fan
A fan speed selector to switch between Low/Med/High
   Secondary View
   A landscape view that displays the AC unit's history data
   What times it was used, on what days
   Average usage per day
   Estimated energy usage or cost
   Third View
   Ability to set an on/off schedule, based, for example, on time and/or location
   Exemplary Settings
   Select Celsius or Fahrenheit
   add/delete AC units
   Exemplary Notifications
   It's going to be a hot day
   You're close to home>turn on AC
   Your AC has been on for XX consecutive hours
   Other Exemplary Displays/Functions
   current temp
   set temp
   hours used/graph/days
   controlling multiple units in one home
   power usage
   field detection/auto on when close
   units overview
      select which units to control
      add/delete AC units
   temp schedule
      add/delete/edit schedule FIG. 8 depicts an exemplary back view of a front panel.
FIG. 9 depicts an exemplary view of a front panel, with a filter and wing extended.
FIG. 10 depicts an exemplary front grill of a front panel.
FIG. 11 depicts an exemplary side view of a front panel.
FIG. 12 depicts a front panel, showing an electronics housing at the bottom. There is one long circuit board with all electronics on it that is mounted to the panel. The plastic panel is a separate part that is installed at the factory and pushes the entire circuit board so it is all the way against the front face of the unit, making sure the capacitive sensors are always in contact with the front face and the LEDs are as close to the face as possible for better light transmission. Additionally, at the top, is shown the "ramp" which directs air from the existing air outlet to the top vents as to not cause turbulence of air while blowing out. This geometry produces improved airflow.
FIG. 13 depicts an exemplary top view of a front panel.
FIG. 14 depicts an exemplary view of a front panel, showing more detail regarding the vents.
FIG. 15 depicts an exemplary view of a wing used with a front panel.

More on Functionality

One or more exemplary embodiments may use artificial intelligence or other methods to make various determinations, such as: (1) what temperature a user prefers the house/apartment/room to have; (2) what times/days a user is normally at home; and/or (3) how long the AC unit takes to cool the room/apartment/home.

The unit (or the app) would then adjust the temperature to, for example, (a) maximize the user's comfort; or (b) minimize the user's electricity bill.

The unit/app also may make use of the following inputs: (i) user's GPS phone location (potentially also the GPS of family members); (ii) the temperature outside; (iii) any sensors that are on, for example, the Wink platform (a platform for supporting connected devices, owned by Quirky, Inc.) or an equivalent platform: motion detectors, spotter, eggminders (to determine whether the user is home); (iv) direct questions to a user via a mobile device (for example: "Hey, looks like your AC is on and you're not home. Would you like us to turn it off?", "What is the warmest you would ever like your apartment to be?", "This is the schedule for your AC unit, would you like to adjust anything?"); and/or (v) AC usage data of other users.

An exemplary embodiment may use a reinforcement learning algorithm (e.g., a (Partially Observable) Markov Decision Process ("(PO)MDP") implemented by at least one processor. However, other supervised and non-supervised machine learning processes may be used to improve the inputs of the reinforcement learning algorithm.

For example, when a user starts using the AC unit, the system will have no information about the user, on which to base decisions. One or more clustering algorithms may be used to compare the user to other users (based on location in the world and demographic information), to predict the initial settings of the AC unit. As the user continues to use the AC unit, these initial settings may be replaced with individual settings.

Similarly, supervised learning algorithms may be used to predict the conditional probability that the user is home or not. That information may then be used as input into the reinforcement learning algorithm. The AC unit may use an online algorithm, in that it will update itself on the server side as the user continues to use the AC.

Exemplary Actions:

The processor will not just control the settings of the AC, but also may know when to send the user push notifications, or to change certain aspects of the UI. For example, if the algorithm is unsure (statistically speaking) whether the user is home or not, it would be able to send a push notification asking the user if they are home.

The processor may build an AC schedule, telling the user when it plans to be on and off during the day.

The processor may tell the user how long it will take for the room to reach a user-specified temperature (using supervised learning algorithms).

Exemplary User Inputs:

A user may adjust their AC schedule, and the unit, via the processor-implemented algorithm, adjusts accordingly.

The user may tell the AC unit that they are home or away. The unit will adjust accordingly (turning on/off respectively).

The user may specify their eco-friendliness. For example, an eco-friendly AC may prioritize its goals in the following order: (1) minimize electricity bill; (2) maximize user's comfort, unless such maximization would conflict with (1). A non-eco-friendly AC may prioritize the same goals in the opposite order.

Further exemplary inputs may include: (a) desired spend/budget; (b) current cost of energy; (c) current and future temperature; (d) demographic information about the user; and/or (d) energy usage of this particular AC unit.

Energy Saver (Eco) mode may have the following functionality

If cool mode before power off, restore default setting: ENERGY SAVER Mode with the same fan speed, set point temperature that it was in prior to the unit being turned Off.

If fan only mode before power off, restore default setting: ENERGY

SAVER Mode, Auto fan speed with the same set point temperature that it was in prior to the unit being turned Off.

If energy saver mode before power off, restore default setting: ENERGY SAVER Mode with the same fan speed, set point temperature that it was in prior to the unit being turned Off.

On the first initial power up, Restore default setting: ENERGY SAVER Mode, Set Point Temperature 70° F. and Fan Speed LOW.

The app may allow a user to set a "geo-fenced area", wherein (based on GPS or other location information), when the user is on the way home, the AC unit is turned on, or begins to cool to a lower temperature.

Exemplary geo-fencing: User sets up "smart away" in the app settings. The user may select a home location by inputting an address. The app will know when the phone has gone out or come into range of that home address and send an update to the Wink server, which will then take the action and own logic of telling the system to react based on the customer selected settings. Logic is in the Wink cloud (server), the app reports location state, and the device follows the instructions given by the cloud.

Exemplary Use Case:

(1) After user enters home address, app displays three options for geo-fencing: (a) turn on AC when within 100 yards; (b) turn on AC when within 1 mile; or (c) turn on AC when within 5 miles.

(2) User selects option (b). App stores that selection.

(3) App obtains GPS location data, and calculates distance from home. GPS data may be managed by the GPS system of the mobile device. There are open api functions that apps can take advantage of. The period of time between polling may depend on the operating system (e.g., iOS or Android) or other parameters of the mobile device.

(4) When distance from home is calculated to be less than 1 mile, app sends notification to server, which then sends "turn on" command to AC unit.

Interaction with other sensors: Logic may be in the cloud here as well. In the use case of a secondary sensor impacting device behavior, a user may use the app to choose something such as: When a window/door sensor detects that a window is open, send an "off" command to the air conditioner through the cloud. The window door sensor will alert the cloud (via, for example, a Wink hub using Zigbee protocol) that it is open. The cloud then receives this message and sees that the user has selected that in this "event" that it will need to tell the air conditioner to turn "off", so it will send that signal from the cloud to the AC unit to turn off In other examples, a temperature sensor may be used to turn the AC unit on (or off) when a certain temperature (internal or external) is detected; a motion sensor may be used to tell the AC unit to turn on when motion is detected (i.e., someone is home); a light switch with wireless functionality may be used to turn the AC unit on, etc.

In at least some of the above examples, the Wink platform (cloud) provides the logic side of the interactions. The user may select settings for geo-location, secondary sensor dependencies, etc., from within the app. The device level impact of those decisions may then be managed/controlled and acted upon in the Wink cloud, which, when a specified state occurs on another device, sends a state change-based command to the AC unit. The AC unit follows the direction of the cloud commands.

Various exemplary embodiments may differ from those described above in at least the following aspects:
(a) Optional drain hole (to allow user to drain water out of the back of unit as needed).
(b) Rear branding and grate to protect fins of radiator and show branding off the back of the unit.
(c) 6K (or other) BTU.
(d) Variations in curtain and box design (e.g., to improve transportability).

Figure 23:
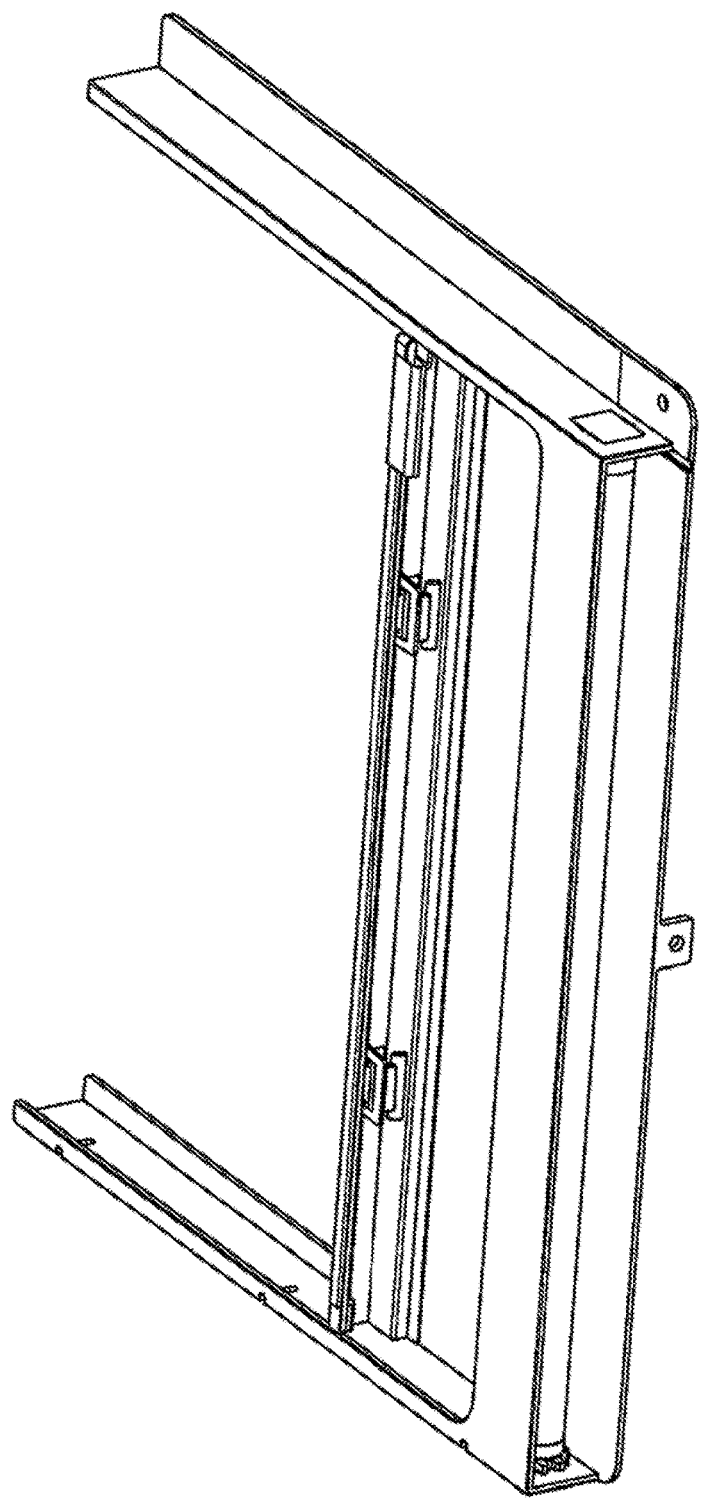
FIGS. 23-25 depict details of exemplary wing construction.
Figure 24:
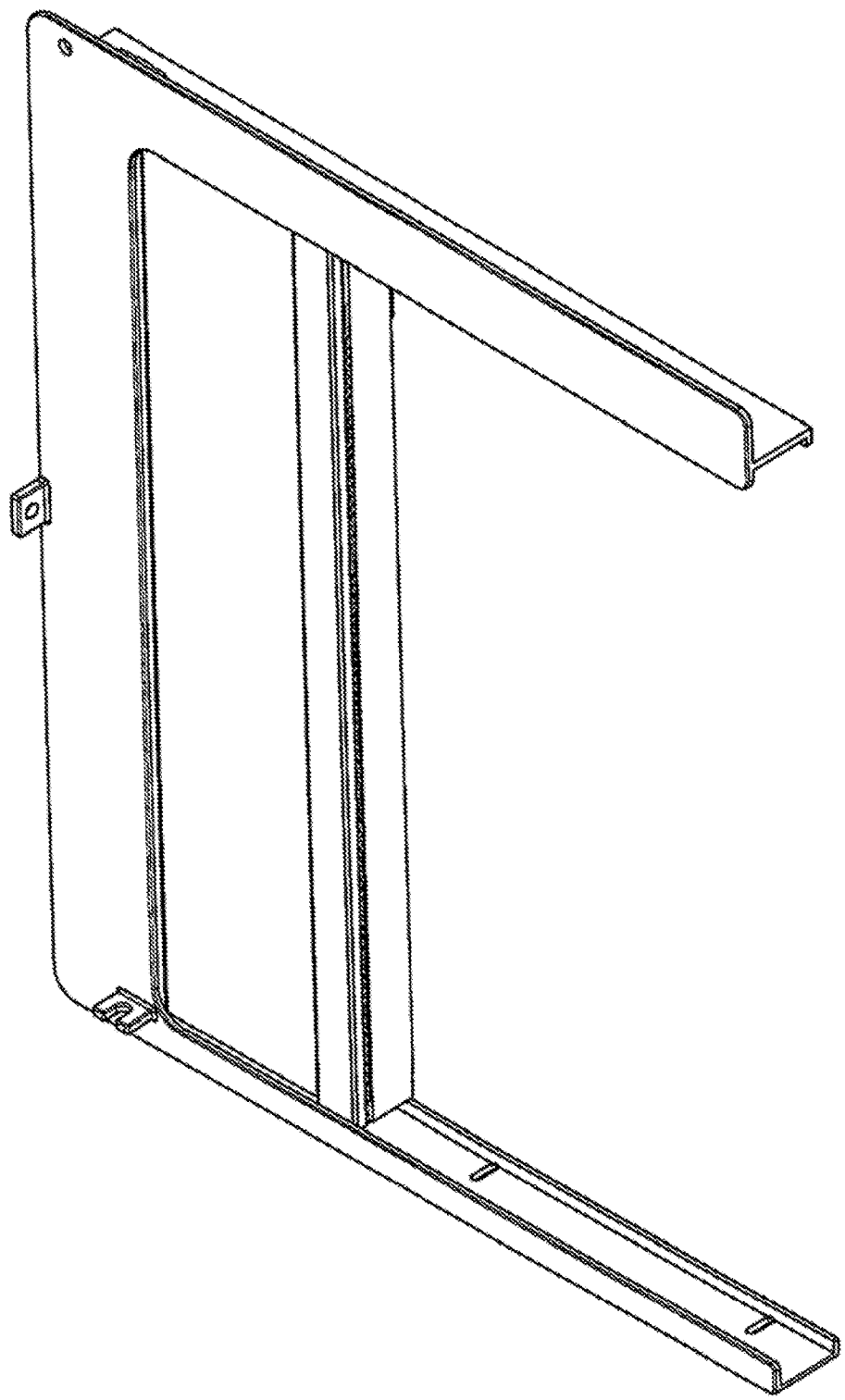
Figure 25:
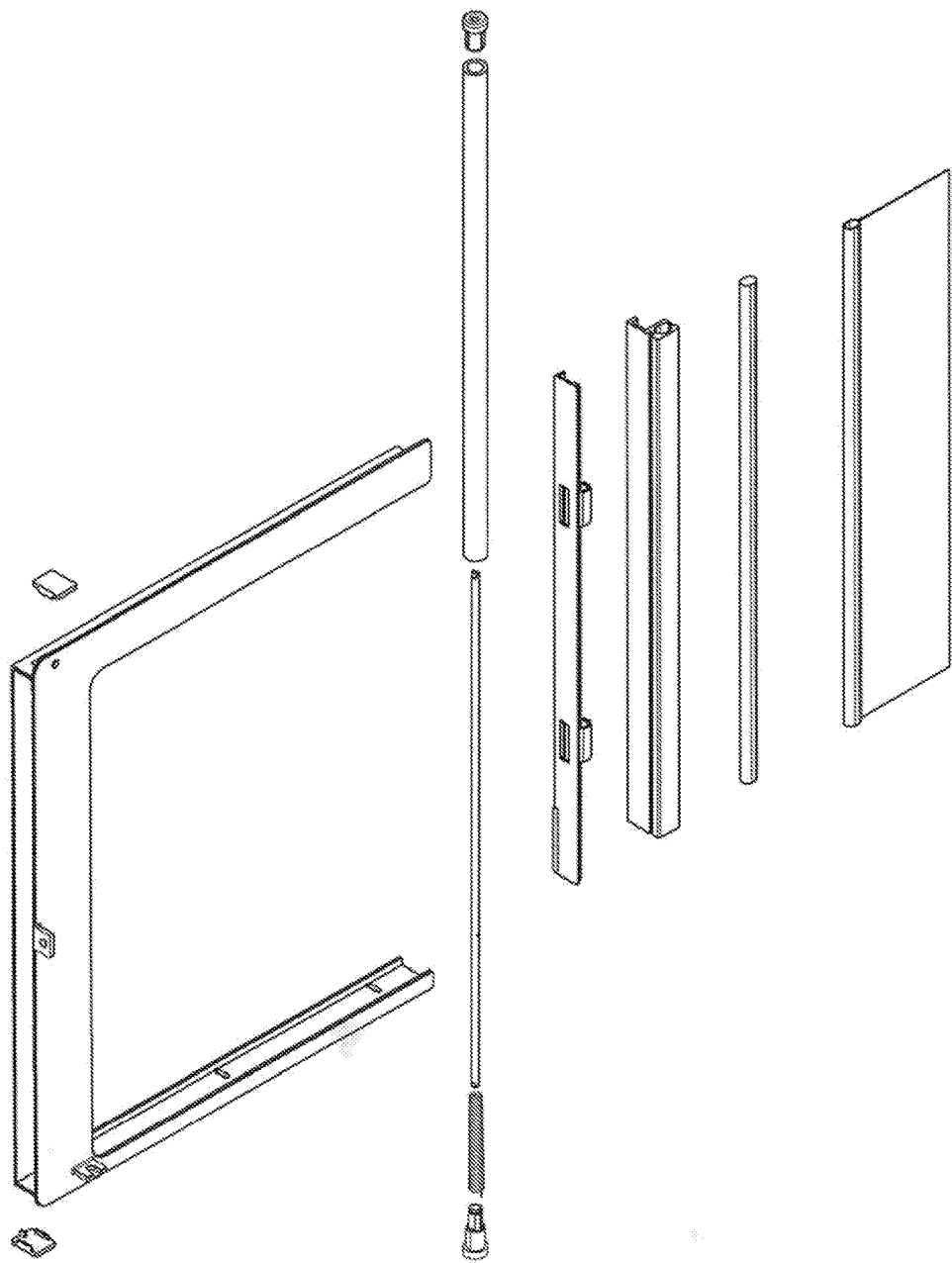

Exemplary Curtain (Wing) Embodiments (see FIGS. 23-25)

In an exemplary embodiment, a wing component comprises a roller around which a curtain fabric is rolled. The curtain and roller are contained in a wing frame, and after the frame is installed in a window opening, the curtain is unrolled from the roller, toward the AC unit. See FIGS. 23 and 24.

FIG. 25 depicts an exploded view of a wing of an exemplary embodiment, along with exemplary materials for the various parts. In this example, the fabric is a nylon coated vinyl fabric, the roller contains an aluminum rod and steel spring, and the remaining parts are made of ABS plastic.

Those skilled in the art will understand that the listed components and materials, and the specific configuration depicted, are intended to be exemplary only, and that other configurations, components, and materials may be used without departing from the scope of the disclosure. More generally, while certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

The invention claimed is:

1. A window air conditioning apparatus comprising:
a controller, operable to control operation of the window air conditioning apparatus in view of a command generated by a server;
a wireless transceiver in communication with the controller, the wireless transceiver operable to communicate with the server via a wireless network;
a compressor controlled by the controller;
a fan controlled by the controller; and
a front panel configured to allow a user to interface with the controller,
wherein the server generates the command in view of a measured usage of the window air conditioning apparatus falling at a predetermined amount, wherein the server further transmits a notification to an application on a mobile device in view of the measured usage, and in response to the user initially starting to use the window air conditioning apparatus, the application compares the user with other users in view of a location of the user and at least one piece of user demographic information using a clustering algorithm to determine at least one initial setting of the window air conditioning apparatus,
wherein the application is configured to replace the at least one initial setting with an individual setting based on a Markov learning algorithm that utilizes at least two of the following inputs:
a user preferred temperature;
a time when the user is at home;
a time required for the window air conditioning apparatus to cool at least one of a room, an apartment, or a home;
a user's global positioning system phone location; or
responses to questions posed to the user; and
wherein the window air conditioning apparatus is controlled based on at least one temperature setting.

2. The window air conditioning apparatus of claim 1, wherein the front panel comprises a grill that provides air intake to the window air conditioning apparatus via circular openings.

3. The window air conditioning apparatus of claim 1, wherein the application enables the user to adjust settings for the window air conditioning apparatus.

4. The window air conditioning apparatus of claim 1, wherein the measured usage comprises energy usage and the predetermined amount comprises a budget, wherein the application enables the user to set the budget for the energy usage.

5. The window air conditioning apparatus of claim 1, wherein the application communicates with the controller to change operation of the window air conditioning apparatus in view of a location of the mobile device.

6. The window air conditioning apparatus of claim 1, wherein the window air conditioning apparatus expels cooled air upward from a top portion.

7. The window air conditioning apparatus of claim 1, wherein the window air conditioning apparatus comprises fabric side panels operable to be wrapped around a roller component.

8. The window air conditioning apparatus of claim 1, wherein the application communicates with the controller to change operation of the window air conditioning apparatus in view of a message transmitted by an environmental sensor.

9. The window air conditioning apparatus of claim 1, wherein the application communicates with the controller to change operation of the window air conditioning apparatus in view of a message transmitted by a wireless device.

10. A mobile device comprising a processor and a memory, the memory storing an application that enables a user to input to change an operation of a window air conditioning apparatus, the mobile device operable to communicate, via a wireless network, with a server, wherein the application provides a predetermined amount of usage to the server, and, in response to a measured usage of the window air conditioning apparatus falling at the predetermined amount, receiving a notification at the application, and in response to the user initially starting to use the window air conditioning apparatus, the application compares the user with other users in view of a location of the user and at least one piece of user demographic information using a clustering algorithm to determine at least one initial setting of the window air conditioning apparatus, wherein the application is configured to replace the at least one initial setting with an individual setting based on a Markov learning algorithm that utilizes at least two of the following inputs:
- a user preferred temperature;
- a time when the user is at home;
- a time required for the window air conditioning apparatus to cool at least one of a room, an apartment, or a home;
- a user's global positioning system phone location; or responses to questions posed to the user; and
- wherein the window air conditioning apparatus is controlled based on at least one temperature setting.

11. The mobile device of claim 10, wherein the predetermined amount comprises a budget and the measured usage comprises energy usage, wherein the application enables the user to set the budget for the energy usage of the window air conditioning apparatus.

12. The mobile device of claim 10, wherein the application communicates with the window air conditioning apparatus to change the operation of the window air conditioning apparatus in view of location of the mobile device.

13. The mobile device of claim 10, wherein the application communicates with the window air conditioning apparatus to change the operation of the window air conditioning apparatus in view of a message transmitted by an environmental sensor.

14. The mobile device of claim 10, wherein the application communicates with the window air conditioning apparatus to change the operation of the window air conditioning apparatus in view of a message transmitted by a wireless device different from the window air conditioning apparatus and the mobile device.

15. The mobile device of claim 10, wherein the application enables the user to input a distance between the mobile device and the window air conditioning apparatus, and wherein the application communicates with the server to change the operation of the window air conditioning apparatus in response to a location mobile device falling within the distance.

16. The mobile device of claim 10, wherein the application provides a plurality of modes to the user, each of the plurality of modes associated with at least one prioritized criterion, wherein the at least one prioritized criterion is associated with energy usage or user comfort, and wherein the server changes the operation of the window air conditioning apparatus in view of a user selected one of the plurality of modes.

17. A server, in communication, with a mobile device, via a first wireless network, and in communication with a window air conditioning apparatus, via a second wireless network, wherein the server is configured to receive commands relating to the window air conditioning apparatus from an application stored on the mobile device the server operable to transmit corresponding commands to the window air conditioning apparatus, wherein the server is configured to transmit a notification to the application in view of a measured usage of the window air conditioning apparatus falling at a predetermined amount, and in response to a user initially starting to use the window air conditioning apparatus, the application compares the user with other users in view of a location of the user and at least one piece of user demographic information using a clustering algorithm to determine at least one initial setting of the window air conditioning apparatus, wherein the application is configured to replace the at least one initial setting with an individual setting based on a Markov learning algorithm that utilizes at least two of the following inputs:
- a user preferred temperature;
- a time when the user is at home;
- a time required for the window air conditioning apparatus to cool at least one of a room, an apartment, or a home;
- a user's global positioning system phone location; or responses to questions posed to the user; and
- wherein the window air conditioning apparatus is controlled based on at least one temperature setting.

18. The server of claim 17, wherein the application communicates at least one location of the mobile device to the server, and the server then transmits a command, in view of the at least one location of the mobile device, regarding an operation of the window air conditioning apparatus.

19. The server of claim 17, wherein the server is in communication with an environmental sensor, and the application communicates instructions to the server to change an operation of the window air conditioning apparatus in view of data transmitted to the server by the environmental sensor.

20. The server of claim 17, wherein the server is in communication with a wireless device different from the window air conditioning apparatus and the mobile device, and the application communicates instructions to the server to change an operation of the window air conditioning apparatus in view of data transmitted to the server by the wireless device.

* * * * *